United States Patent
Plesh et al.

(10) Patent No.: US 8,915,505 B2
(45) Date of Patent: Dec. 23, 2014

(54) MOBILE GIMBALED 5-GALLON BUCKET DOLLY

(75) Inventors: Michael Oleg Plesh, Sun Valley, CA (US); Jeffrey D. Atherton, Alhambra, CA (US); Brian Anthony Babson, Long Beach, CA (US); Joseph Sampietro, Los Angeles, CA (US); Jason Pilarski, Los Angeles, CA (US)

(73) Assignee: Bucket All, LLC, Los Angeles, CA (US)

( * ) Notice: Subject to any disclaimer, the term of this patent is extended or adjusted under 35 U.S.C. 154(b) by 0 days.

(21) Appl. No.: 13/375,483

(22) PCT Filed: May 31, 2010

(86) PCT No.: PCT/US2010/036790
§ 371 (c)(1), (2), (4) Date: Feb. 21, 2012

(87) PCT Pub. No.: WO2010/141393
PCT Pub. Date: Dec. 9, 2010

(65) Prior Publication Data
US 2012/0139200 A1    Jun. 7, 2012

Related U.S. Application Data

(63) Continuation-in-part of application No. 12/475,555, filed on May 31, 2009, now Pat. No. 8,276,923, and a continuation-in-part of application No. 29/360,647, filed on Apr. 29, 2001, now Pat. No. Des. 637,784.

(60) Provisional application No. 61/057,847, filed on May 31, 2008, provisional application No. 61/343,588, filed on May 1, 2010.

(51) Int. Cl.
| | | |
|---|---|---|
| B62B 1/00 | (2006.01) | |
| B62B 1/10 | (2006.01) | |
| B62B 1/14 | (2006.01) | |
| B62B 1/16 | (2006.01) | |
| B62B 1/26 | (2006.01) | |
| B62B 1/12 | (2006.01) | |
| B62B 5/00 | (2006.01) | |

(52) U.S. Cl.
CPC . *B62B 1/12* (2013.01); *B62B 1/264* (2013.01); *B62B 2203/04* (2013.01); *B62B 2202/12* (2013.01); *B62B 2205/006* (2013.01); *B62B 1/008* (2013.01); *B62B 5/0079* (2013.01); *B62B 1/16* (2013.01); *B62B 2202/028* (2013.01)
USPC ............ 280/79.5; 280/47.131; 280/47.18; 280/47.24

(58) Field of Classification Search
CPC ............ B62B 1/00; B62B 1/10; B62B 1/14; B62B 1/16; B62B 1/26
USPC ........... 280/47.131, 47.18, 47.19, 47.24, 79.5
See application file for complete search history.

(56) References Cited

U.S. PATENT DOCUMENTS 337,870 A * 3/1886 Roberts ................. 414/457
780,777 A    1/1905 Coiling
(Continued)

FOREIGN PATENT DOCUMENTS

WO    WO 2008/109897 A1    9/2008
WO    WO 2010/141393 A1    12/2010

*Primary Examiner* — Hau Phan
*Assistant Examiner* — Bryan Evans
(74) *Attorney, Agent, or Firm* — Law Office of David Hong

(57) ABSTRACT

A single handled two-wheeled gimbaled bucket dolly or hand truck is configured to lift, transport and pour the contents of a bucket or container with minimal operator effort. This dolly may use a horizontal "C" shaped frame cross member and two rigid vertical gimbaled columns to support a pivoting bucket or a modular tray or basket. This apparatus allows the bucket to be tilted a 180 degrees on its horizontal axis and to effortlessly dispense its contents and to transport the bucket or tray across uneven terrain.

14 Claims, 20 Drawing Sheets

(56) References Cited

U.S. PATENT DOCUMENTS

| | | | |
|---|---|---|---|
| 1,255,070 A | 1/1918 | Waller | |
| 1,255,484 A * | 2/1918 | Stephens | 414/457 |
| 1,468,422 A | 9/1923 | Toof | |
| 1,870,163 A * | 8/1932 | Behling | 414/449 |
| 2,077,349 A | 4/1937 | Hobbis | |
| 2,216,202 A | 10/1940 | Golladay | |
| 2,324,747 A | 7/1943 | Weissert | |
| 2,475,278 A | 7/1949 | Coakley | |
| 2,654,493 A | 10/1953 | Kernkamp | |
| 2,683,012 A | 7/1954 | Reinsma | |
| 2,717,785 A | 9/1955 | Ray | |
| 2,770,466 A | 11/1956 | Pearson | |
| 2,835,501 A | 5/1958 | Chamberlin | |
| 3,016,272 A | 1/1962 | Bean | |
| 3,440,677 A | 4/1969 | Flomerfelt | |
| 3,479,047 A | 11/1969 | Bailey | |
| 3,612,482 A | 10/1971 | Eck | |
| 3,871,725 A | 3/1975 | Vilen | |
| 3,875,981 A | 4/1975 | Brenner | |
| 3,891,106 A * | 6/1975 | Alcanzare | 414/425 |
| 3,926,452 A | 12/1975 | Goines | |
| 4,261,596 A | 4/1981 | Douglas | |
| 4,274,649 A | 6/1981 | Vanderhorst | |
| 4,313,701 A | 2/1982 | Brust | |
| 4,319,761 A | 3/1982 | Wells | |
| 4,353,596 A | 10/1982 | Gibson | |
| 4,453,876 A | 6/1984 | Arpin | |
| 4,511,154 A | 4/1985 | Dalosio | |
| 4,576,237 A | 3/1986 | Arney | |
| 4,861,110 A | 8/1989 | Rumpke | |
| 4,915,535 A | 4/1990 | Willetts | |
| 5,123,668 A * | 6/1992 | Ligas | 280/204 |
| 5,149,116 A | 9/1992 | Donze | |
| 5,183,280 A | 2/1993 | Gresch | |
| 5,366,189 A | 11/1994 | Thompson | |
| 5,464,102 A | 11/1995 | LeBlanc | |
| 5,469,944 A | 11/1995 | Wang | |
| D366,748 S | 1/1996 | Harrington | |
| 5,568,848 A | 10/1996 | Liang | |
| 5,713,583 A | 2/1998 | Hansen | |
| 5,845,951 A | 12/1998 | Webb | |
| 5,938,396 A | 8/1999 | Audet | |
| 6,041,945 A | 3/2000 | Faraj | |
| 6,056,177 A | 5/2000 | Schneider | |
| 6,158,762 A | 12/2000 | Wong | |
| 6,349,955 B1 | 2/2002 | Cottard | |
| 6,490,880 B1 | 12/2002 | Walsh | |
| 6,505,843 B1 | 1/2003 | Williams | |
| 6,565,279 B1 | 5/2003 | Skovronski | |
| 7,150,465 B2 | 12/2006 | Darling | |
| 7,290,776 B2 | 11/2007 | Pascznk | |
| 7,878,514 B1 | 2/2011 | Hopkins | |
| 7,891,478 B2 | 2/2011 | Gunst | |
| 7,905,502 B2 | 3/2011 | Oliver | |
| 2009/0212535 A1 | 8/2009 | Darling | |

\* cited by examiner

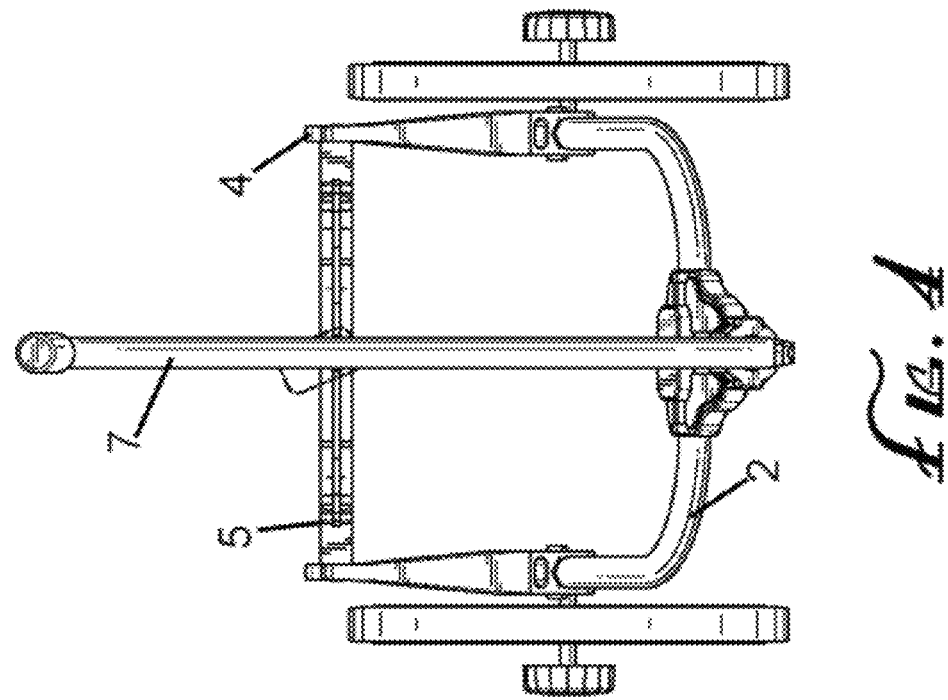
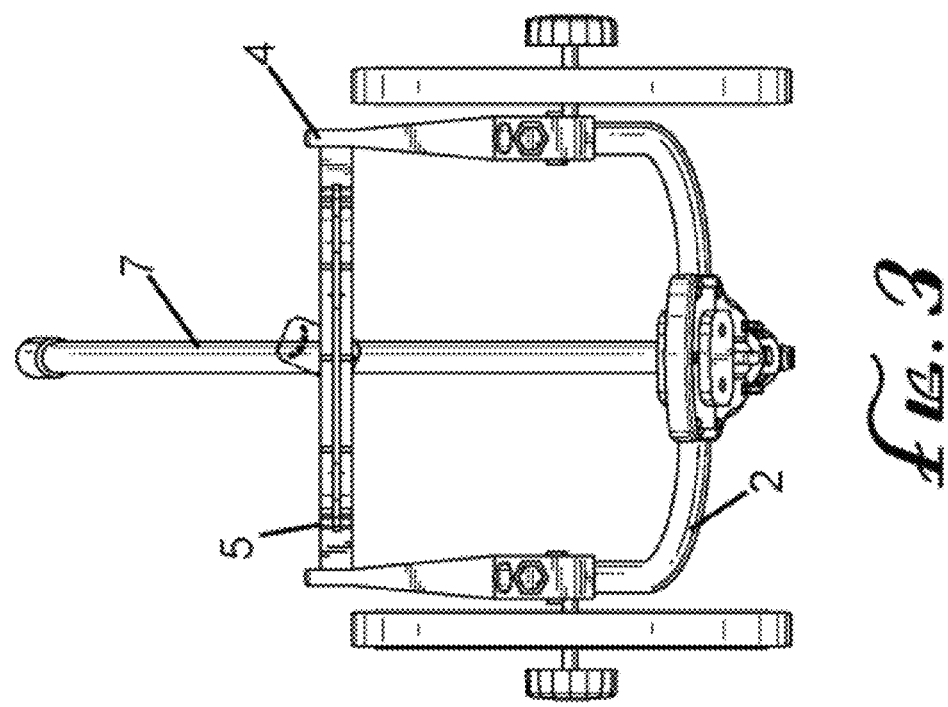

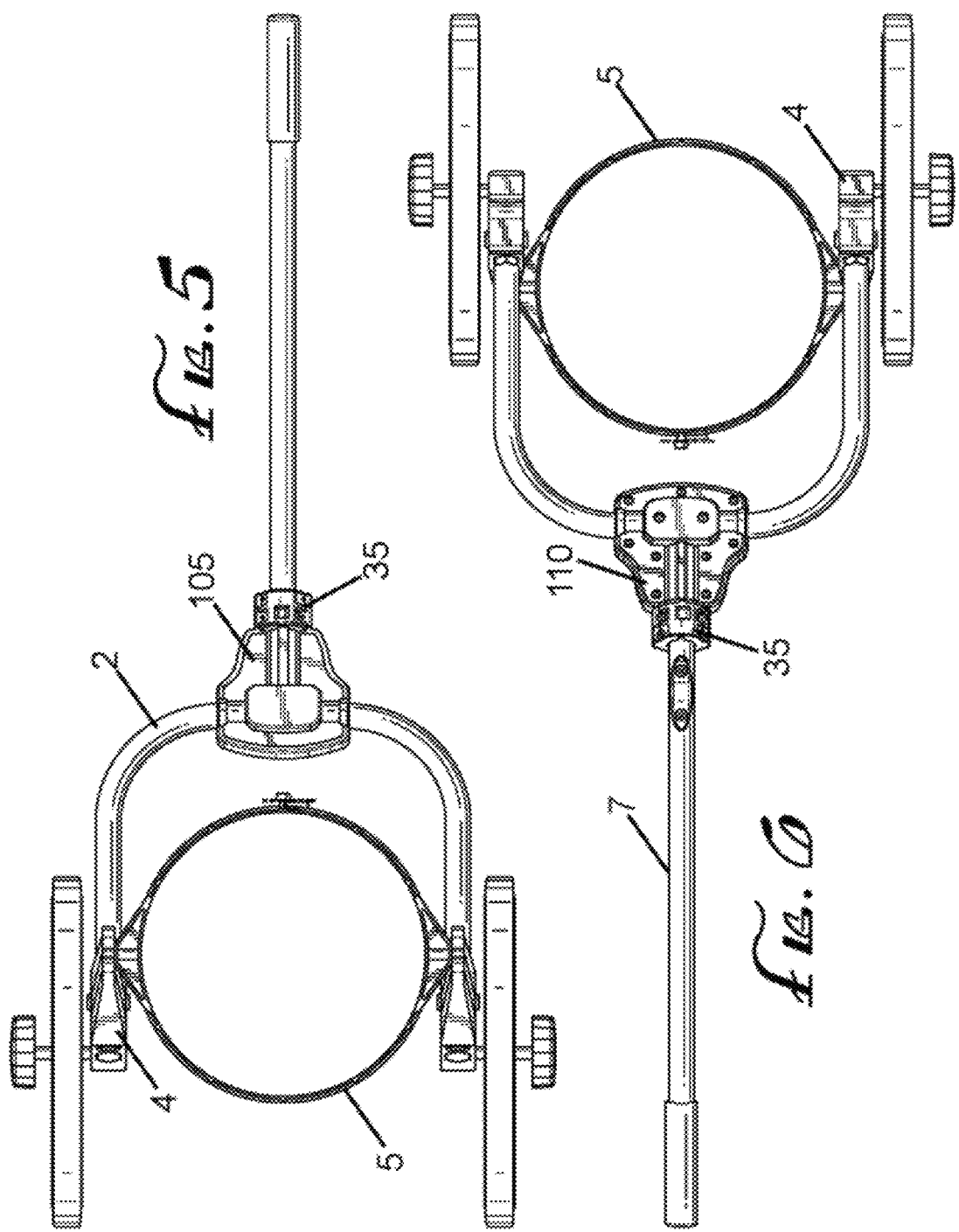

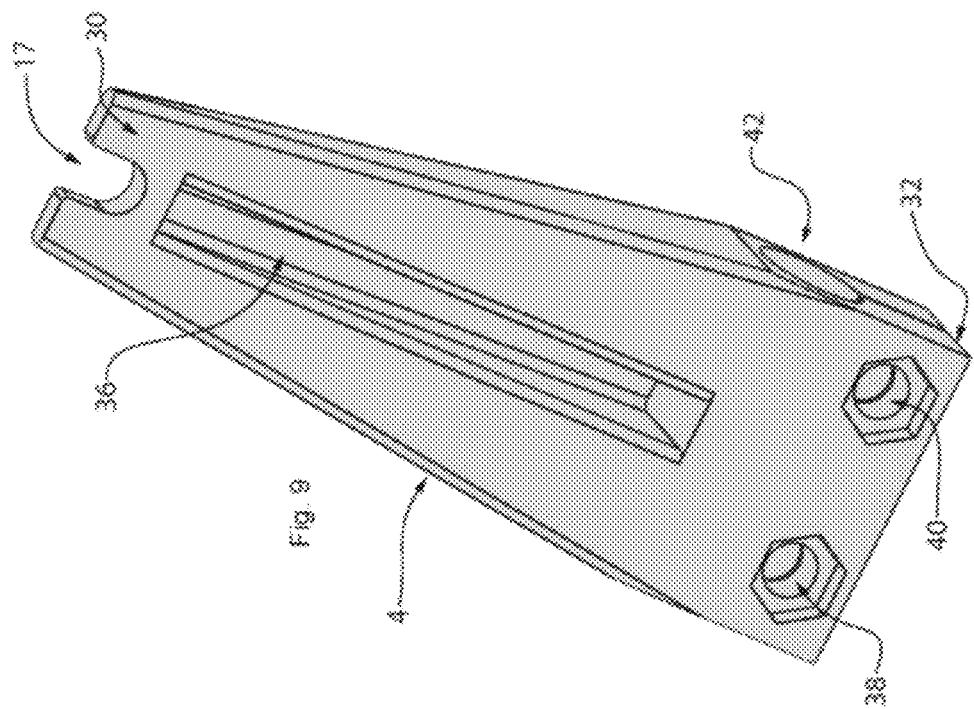
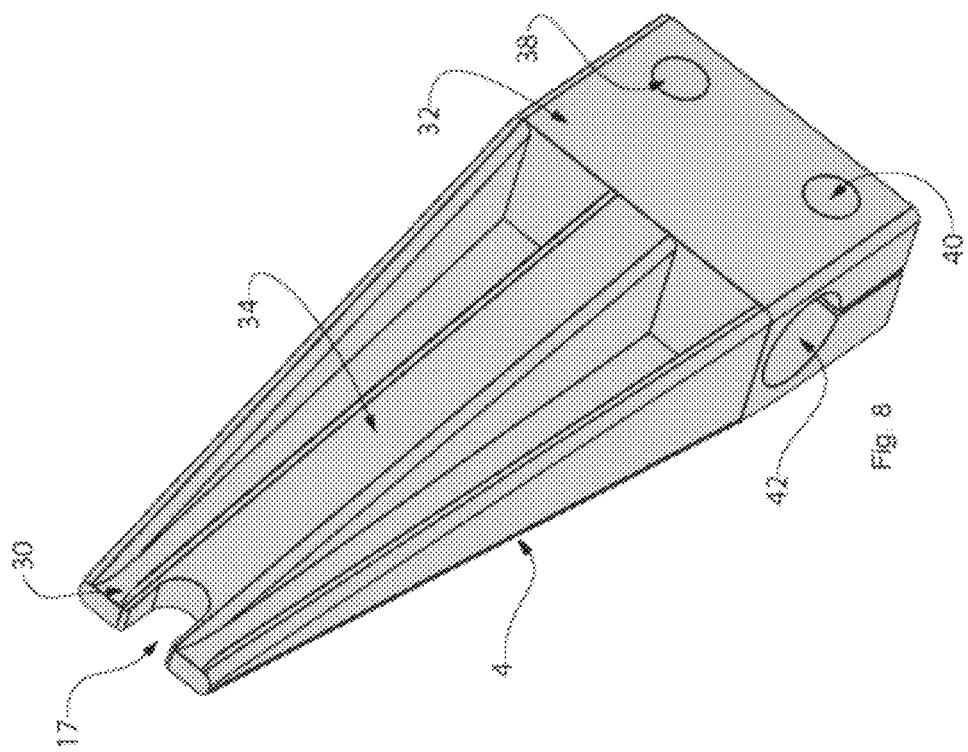

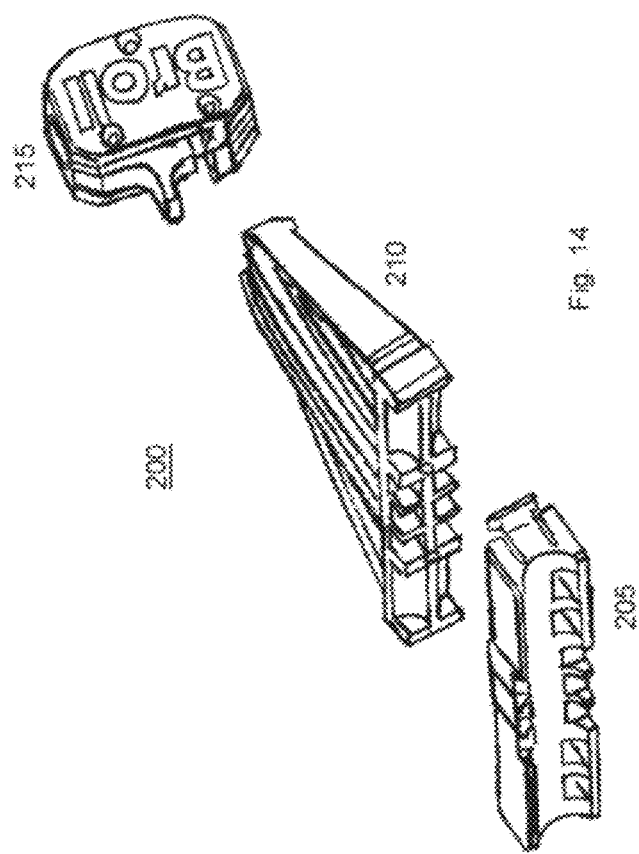
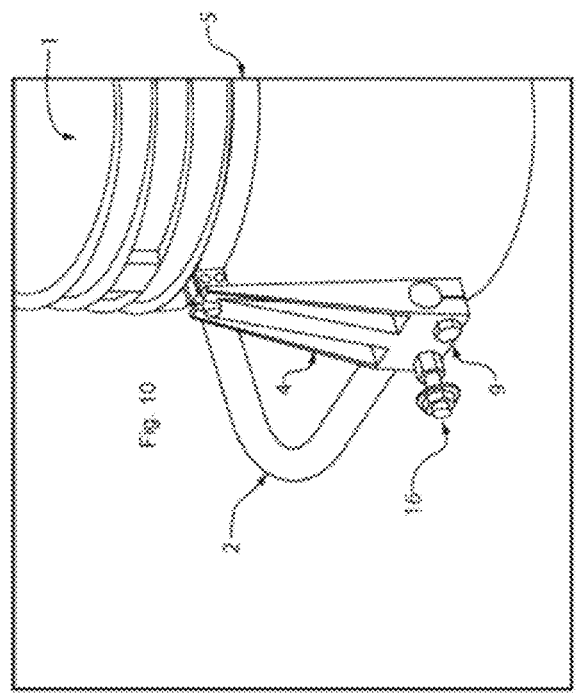

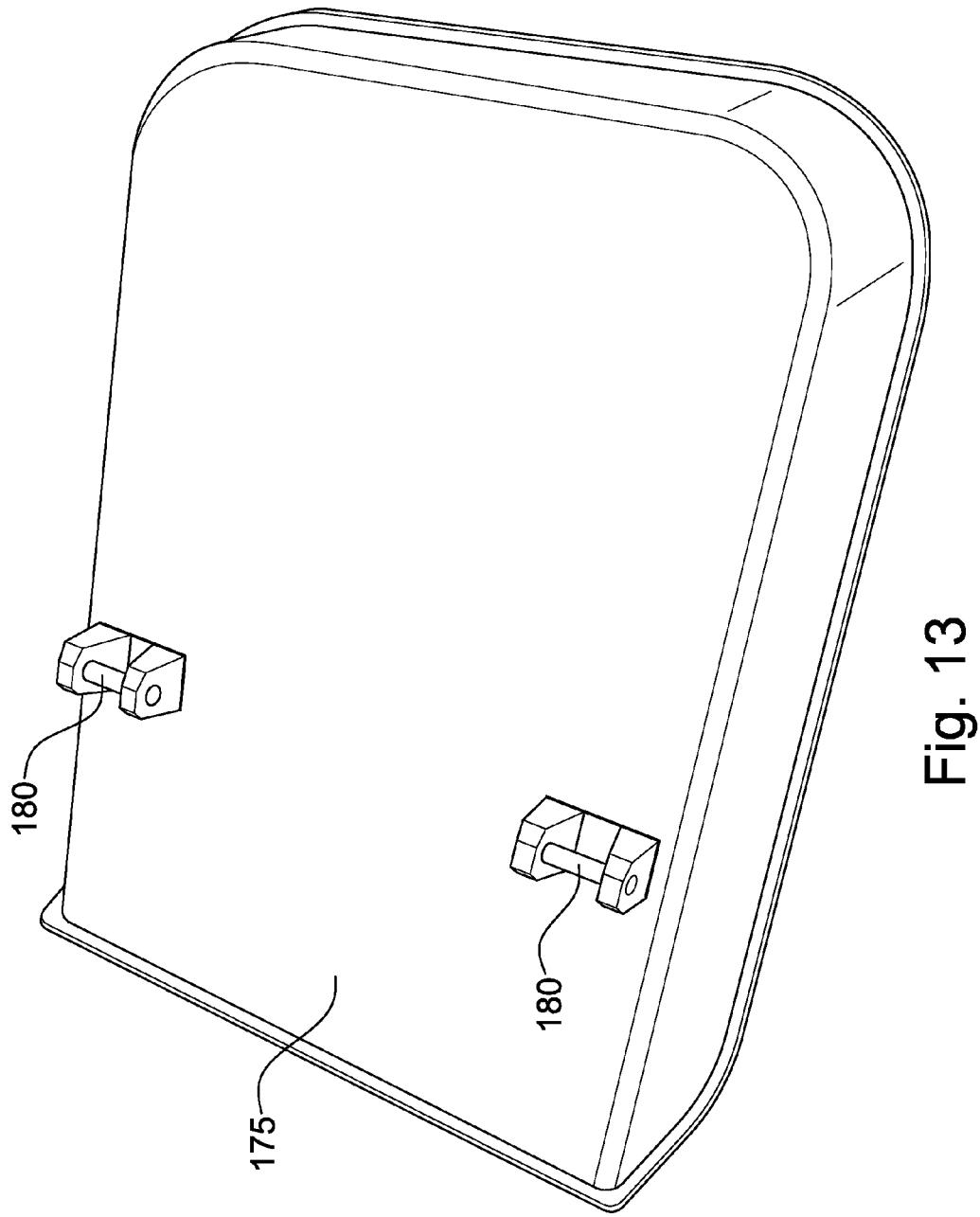

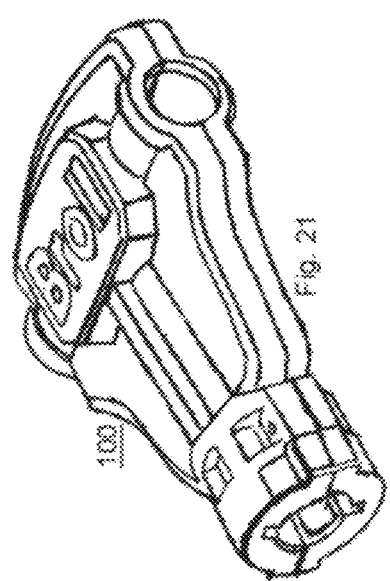
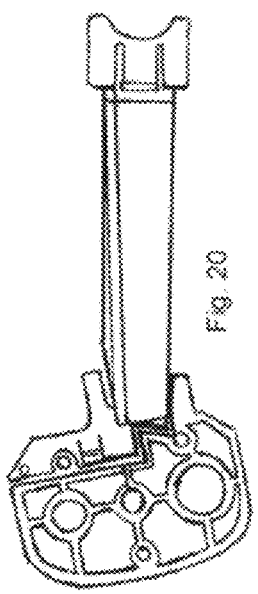
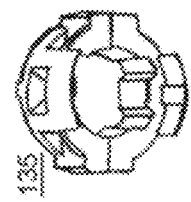
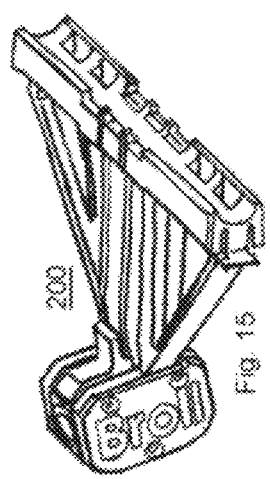
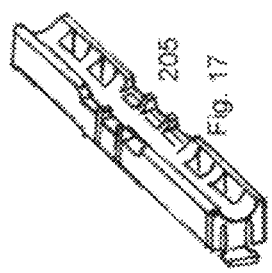
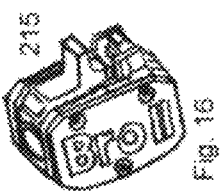
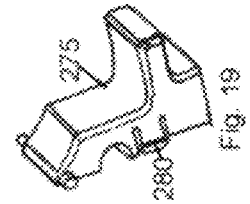
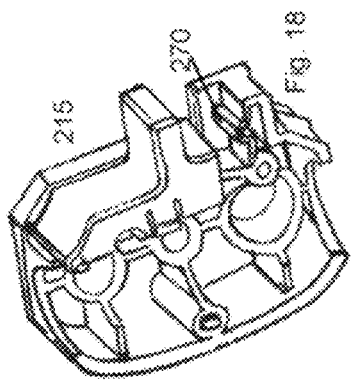

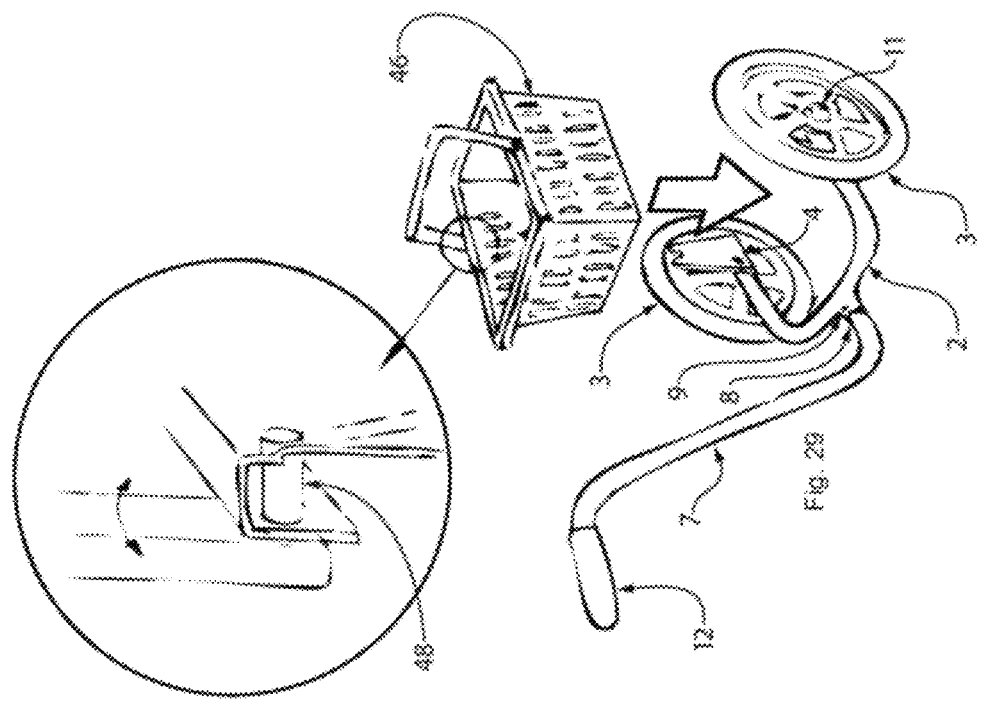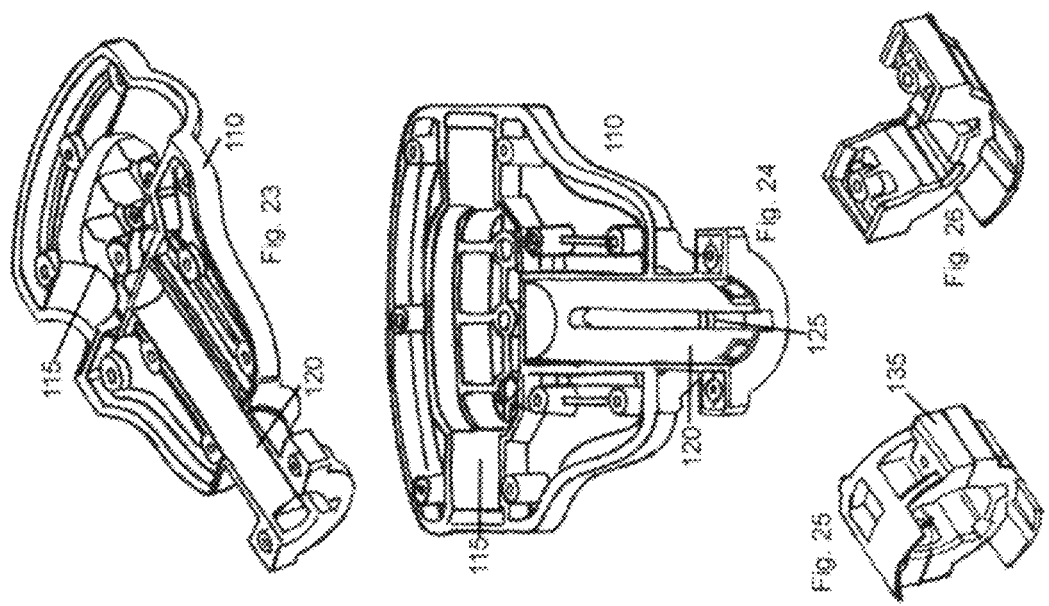

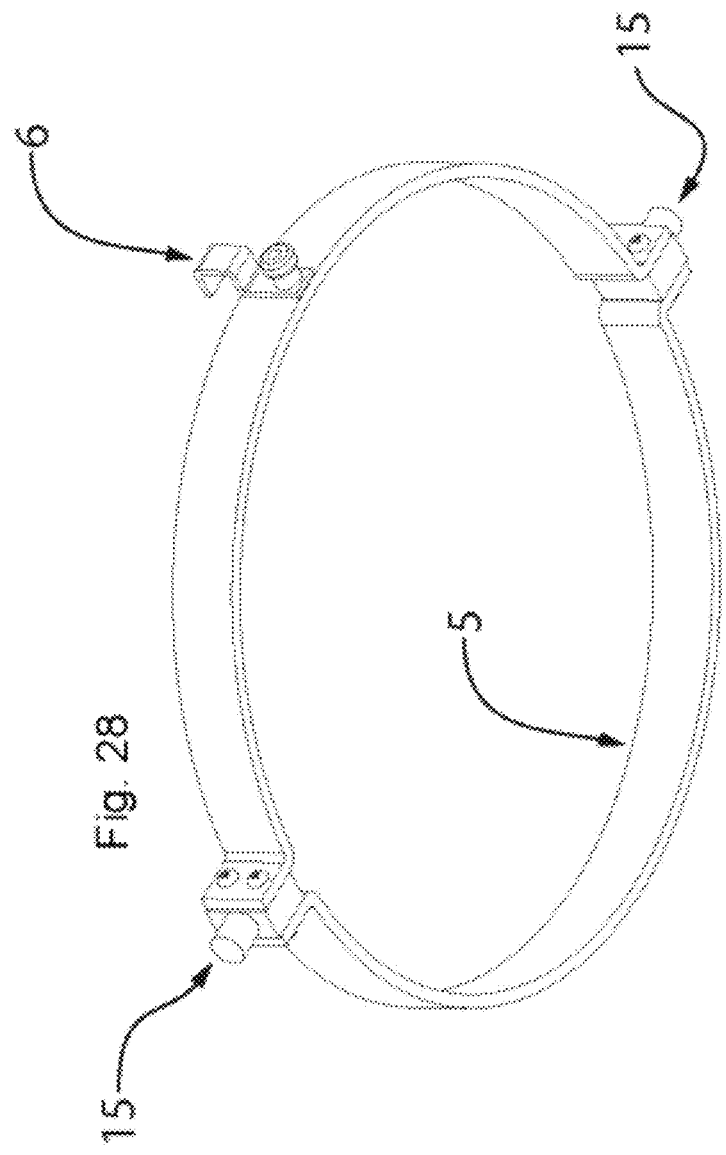

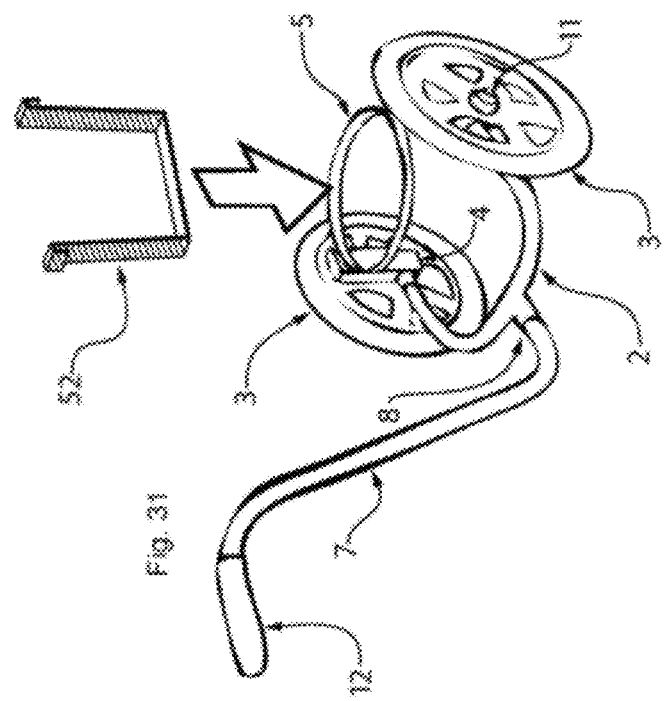
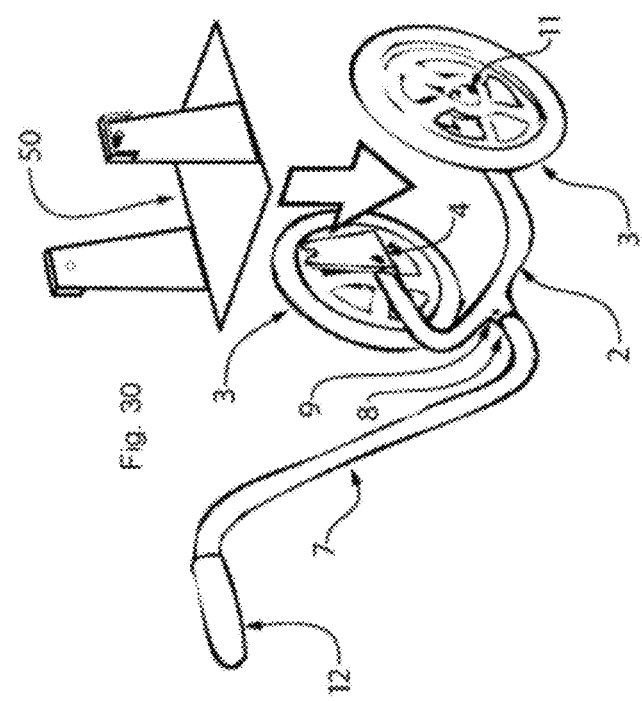

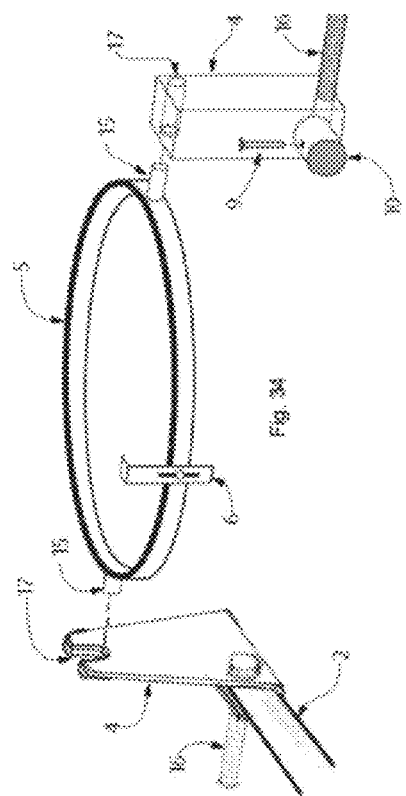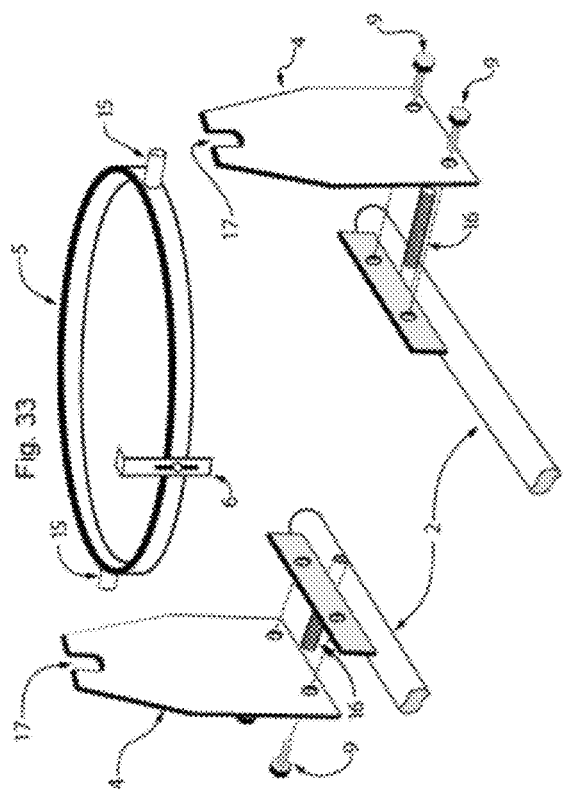

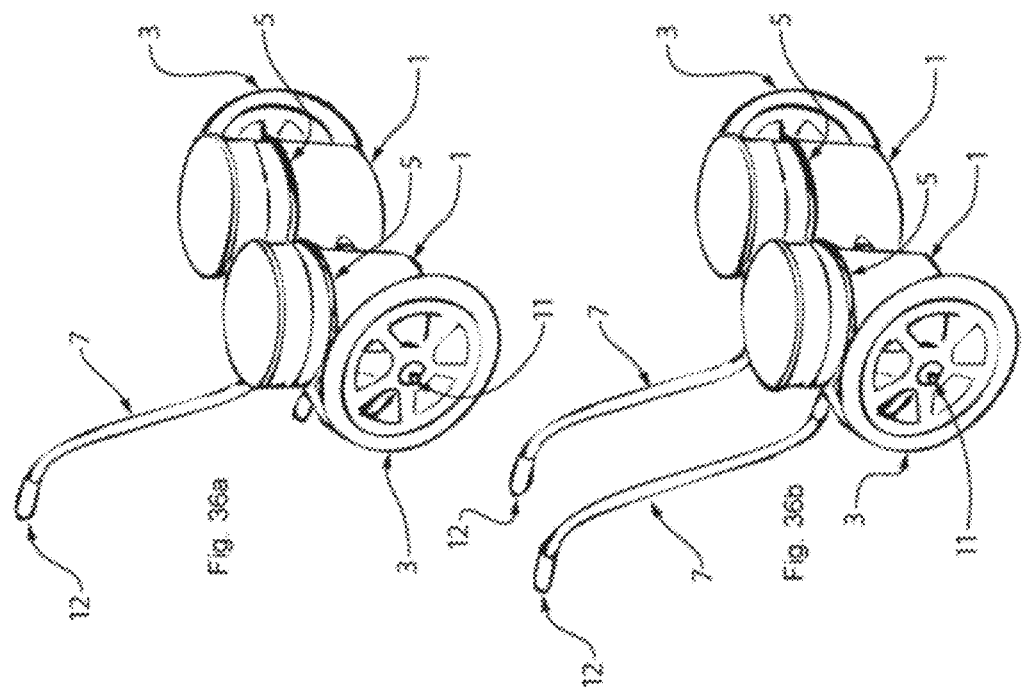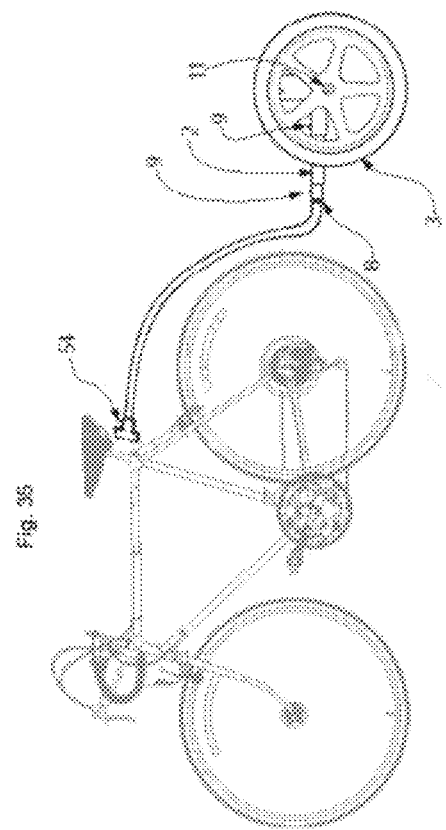

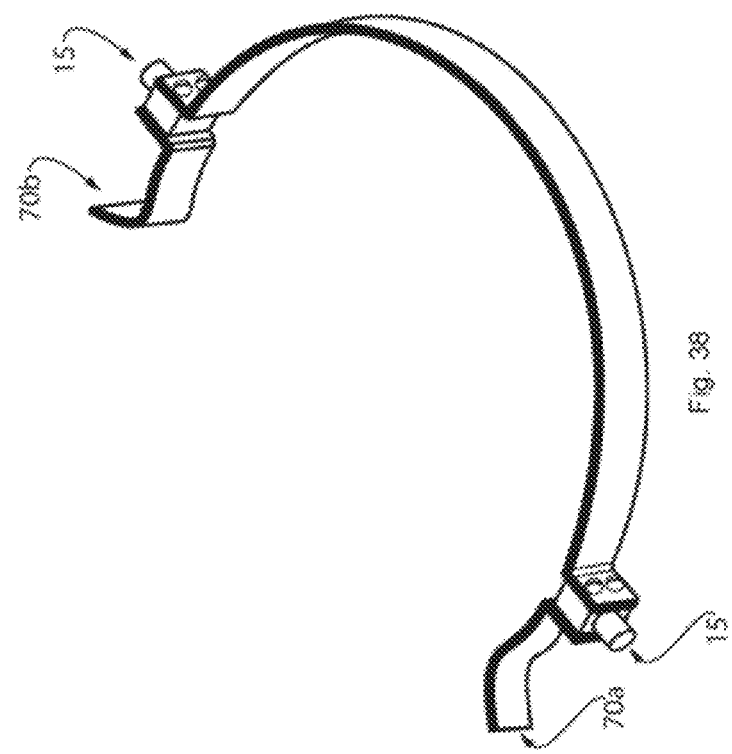
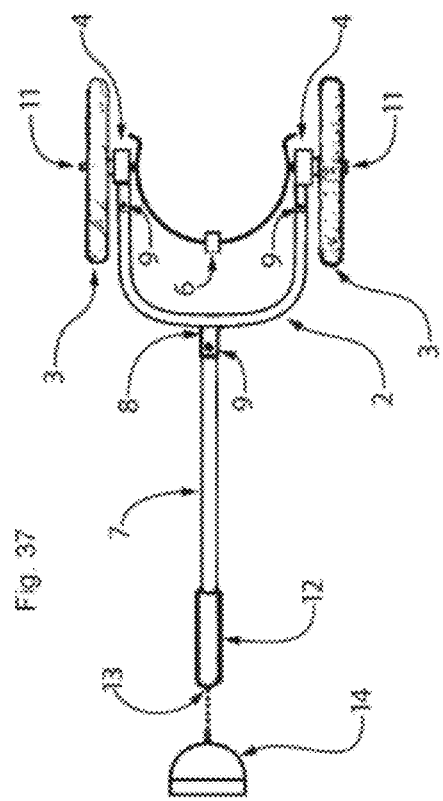

MOBILE GIMBALED 5-GALLON BUCKET DOLLY

This application claims the benefit of PCT/US2010/036790, filed on May 31, 2010; U.S. patent application Ser. No. 12/475,555, filed on May 31, 2009, now U.S. Pat. No. 8,276,923 which claims the benefit of U.S. Provisional Patent Appl. No. 61/057,847, filed on May 31, 2008; U.S. Design patent application No. 29/360,647, filed Apr. 29, 2010, which is now U.S. Design Pat. No. D637,784; and U.S. Provisional Patent Appl. No. 61/343,588, filed May 1, 2010; these applications are incorporated by reference in entirety.

BACKGROUND OF THE INVENTION

1. Field of the Invention

The field of the present invention relates to a transportation dolly or hand truck for a container.

2. Description of the Prior Art

Conventional dolly or hand truck designs have a number of disadvantages or shortcomings. For example, when at rest, a conventional dolly or hand truck places the entire load far in front of the centerline of the axles, which makes it necessary to apply a significant force to pull the handle back to bring all the weight of the apparatus directly over the vertical centerline of the axles, the position needed for the axles to carry the full weight of the load. In travel mode, the weight shifts slightly behind the axle resulting in the need for a constant lifting force on the handle. Also, the distribution of weight may make the dolly or hand truck difficult to turn or maneuver.

Another drawback of conventional dolly or hand truck designs is that the angle of the load being carried shifts with the angle of the handle, thus potentially leading to spillage of the contents or preventing a container from being filled as much as it otherwise could be.

It would therefore be advantageous to provide a dolly or hand truck that is particularly well adapted to moving containers and other loads, and that requires reduced effort to move and maneuver. It would also be advantageous to provide a dolly or hand truck that distributes weight in a superior manner, and prevents spillage of loaded containers.

SUMMARY OF THE INVENTION

This invention relates to a transportation dolly or hand truck for one or more containers or objects to be transported. One embodiment involves a single handled two-wheeled gimbaled bucket dolly, specifically designed to lift, transport and pour the contents of a generic 5-gallon plastic bucket with minimal operator effort. This design can be combined with a second gimbaled bucket dolly into one unit allowing for lifting, transporting and pouring the contents of two generic 5-gallon buckets. This invention also provides efficient modularity by allowing the attachment of various alternative carrying devices such as attachable trays or baskets, which are attached to both the vertical uprights and also the handle body.

According to one or more embodiments, an apparatus for transporting a container or an object, comprising: a rigid frame having a pair of forked frame members defining a gap between them, and a levered handle extension angled with respect to the forked frame members; a first connection part and a second connection part; the first and the second connection parts sandwich the levered handle extension to the frame; and a securing device or a means, which is located on the first and second connection parts, for removably securing the levered handle extension to the frame, including without limitation a rotating lock or threaded lock; a pair of wheels attached so they each respectively support one of said forked frame members; a pair of mounting supports located respectively on each of said forked frame members, said mounting supports protruding upwards from said forked frame members; each of said mounting supports having a slot; a container holder pivotally attached to the slots of the mounting supports, said container holder adapted to securely support a container; and wherein the container holder is adapted to pivot with the weight of the container as the levered handle extension is raised or lowered so that the container remains in an upright position regardless of the position of the levered handle extension.

The apparatus has a first resting position and a second active position; in the first resting position, the levered handle extension is at a first elevation; in the second resting position, the levered handle extension is a second elevation; and the second elevation is higher than the first elevation; the levered handle extension can also have a locking mechanism to engage the container holder. The container holder can comprise a rigid circular band with two posts on its outer periphery on opposing sides, each of said posts positioned in the slots of said mounting supports; the container holder can also be a detachable tray, and said tray has at least two tray connection points for engaging the slots on the mounting supports. The levered handle extension terminates in a handle member and said levered handle extension is detachable from the portion of the rigid frame connected to the forked frame members; the handle extension can be substantially S-shaped, having a first portion substantially parallel with the forked frame members, a second portion substantially perpendicular to said forked frame members, and a third portion terminating in a handle substantially parallel with the forked frame members.

BRIEF DESCRIPTION OF THE DRAWINGS

FIG. 3 is a front plan view of the dolly or hand truck of FIG. 1.

FIG. 4 is a rear plan view of the dolly or hand truck of FIG. 1.

FIG. 5 is a top view of the dolly or hand truck of FIG. 1.

FIG. 6 is a bottom view of the dolly or hand truck of FIG. 1.

FIGS. 8 and 9 are views of another embodiment of the vertical upright support.

FIG. 10 is a view of the vertical upright support in relation to frame and the bucket.

FIG. 13 is a bottom view of the "garden tray" or container holder.

FIG. 14 is an exploded view of one preferred embodiment of the bracket (to be attached to the garden or pro tray), yoke and locking apparatus (to be mounted on the S-shaped handle).

FIG. 15 is a view of the assembled components of FIG. 14.

FIG. 16 is a view of the locking apparatus of FIG. 14.

FIG. 17 is a view of the bracket of FIG. 14.

FIG. 18 is a cross-section view of the locking apparatus of FIG. 14.

FIG. 19 is a view of one component (locking cam) of the locking apparatus of FIG. 14.

FIG. 20 is a partial cross-section view of the locking apparatus of FIG. 14.

FIG. 21 is a view of the "T-Connector" assembly that connects the handle body to the "C-Frame".

FIGS. 22, 25 and 26 are views of the locking collar assembly of FIG. 21.

FIG. 23-24 are views of the bottom or second portion of the "T-Connector" assembly of FIG. 21.

FIG. 28 is another embodiment of the pivoting and circular container holder.

FIG. 29 shows the shopping basket embodiment for the invention.

FIG. 30 shows a tray or a flat bottom insert to engage the vertical support.

FIG. 31 shows an embodiment of a container holder insert for containers or items that do not have a lip or flange.

FIG. 33 shows another version of the vertical support; the lower end of the vertical support could also be connected to the frame ends via holes drilled through the frame ends and with connecting bolts.

FIG. 34 shows a comparison between some of the versions of the vertical support.

FIG. 35 shows an embodiment including a bicycle attachment for towing.

FIGS. 36*a* and 36*b* show multiple barrel or container carrier versions of the invention.

FIG. 37-38 show an open ended container holder with a friction lock.

Figure 1:
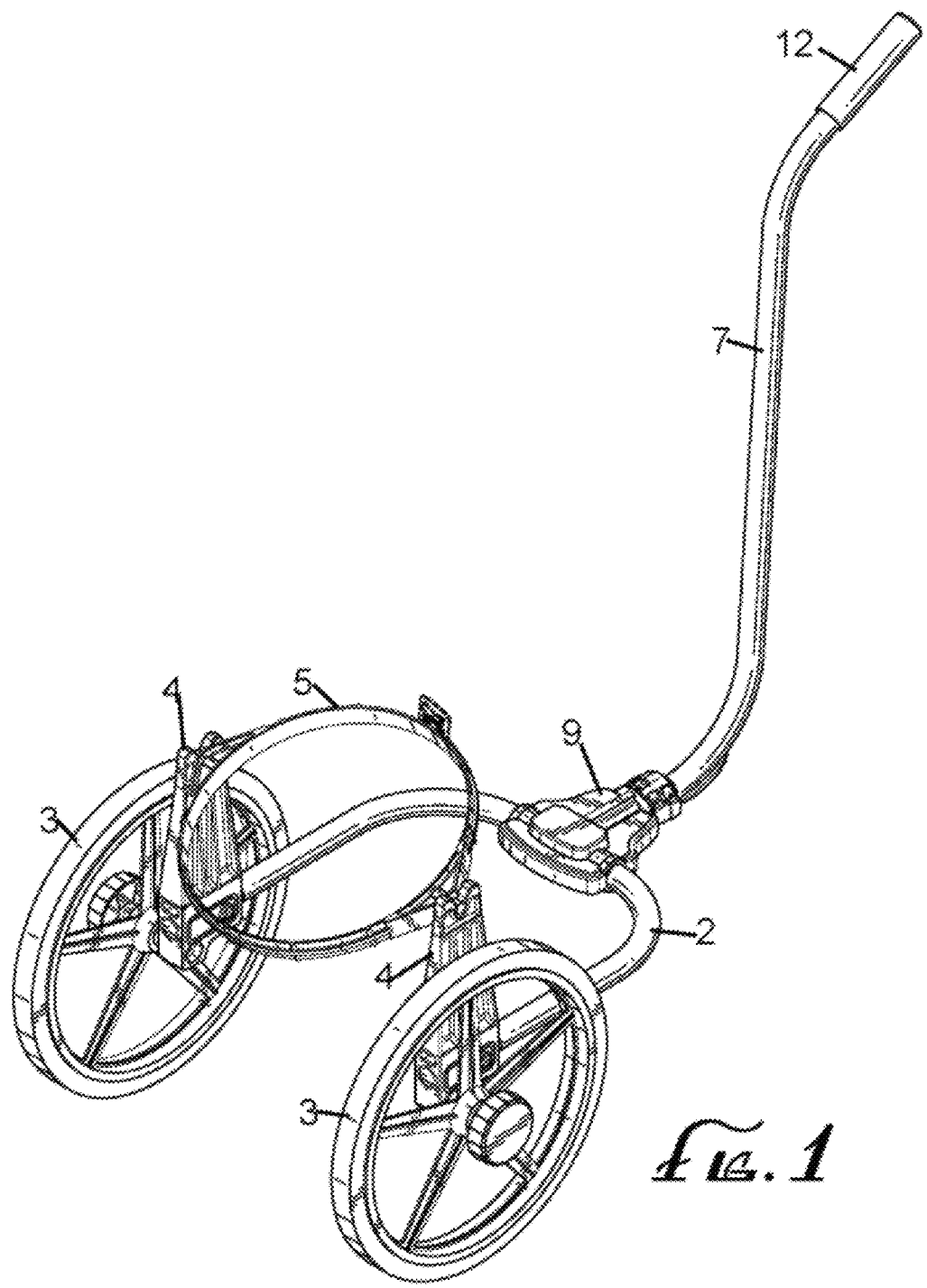
FIG. 1 is a perspective view of one embodiment of the dolly or hand truck invention.

PARTS LISTING 1 plastic bucket
2 C-frame or Frame (C-shape not intended to be limiting)
3 tires
4 vertical support column
5 Container Holder or circular shaped ring
6 bucket clasp
7 handle body (tube)
8 socket for handle
9 fasteners
10 rod (male post for attachment of the "C-Shaped" Cross Member).
11 fasteners to axle for tires
12 handle grip
13 Handle mount for D-shaped handle
14 D-shaped handle
15 protruding posts or male parts (from circular container holder)
16 axle (for mounting wheels)
17 female socket or notch or slot or receptor (for accepting male posts from circular container holder)
18 & 19—independent wheel suspension or springs or shocks
20—fold down kick stand
21—disc brake lever
22—disc brake assembly
23—disc brake cable
24-26—bucket tilt locking device
27—motor
28—motor drive cover
30 first vertical support end (top)
32 second vertical support end (bottom)
34 ribs in vertical support
36 grooves in vertical support
38 first hole in lower or second vertical support end
40 second hole in lower or second vertical support end
42 third hole in lower or second vertical support end
44 inserts for container holder
46 basket
48 male portions in basket for connection with vertical support slot
50 flat insert
52 insert for container holder for items or containers that do not have a flange or lip
54 connector for vehicle (bicycle)
56*a* first part of container support holder
56*b* second part of container support holder
58 first or inner vertical support component
60 second or outer vertical support component
62 strap
64 gate for container holder
66 rear portion of container holder
68*a*, 68*b* front portions of container holder
70*a*, 70*b* grasping ends
100 T-connector (connects handle part to the C-Frame).
105 first or top portion of T-connector
110 second or bottom portion of T-connector
115 first channel or groove for C-frame
120 second channel or groove for handle
125 third channel or pin channel within the second channel (for handle)
130 fourth channel or mating groove (female groove) for boss on inside of locking collar.
135 locking collar
140 first or top portion of locking collar
145 second or bottom portion of locking collar
150 boss on inside of first or top portion of locking collar
155 boss on inside of second or bottom portion of locking collar
160 handle skid pad
170 pro-tray
175 garden tray
180 connectors on tray to engage top portion of vertical supports
200 yoke apparatus to connect accessories (trays) to main apparatus
205 bracket or mounting bracket
210 yoke structure
215 handle collar and lock
205 bracket or mounting bracket
220 first or mounting side of bracket to accessory
225 second or yoke attachment side of bracket
210 yoke structure
230 first end of yoke or attachment side to bracket
235 second end of yoke that attaches to handle collar and lock
240 top of yoke
245 bottom of yoke
250 engagement area of yoke to handle collar and lock
255 slot for engaging tooth on the handle collar and lock
215 handle collar and locking cam
260 first side of handle collar
265 second side of handle collar
270 engagement area or tooth that engages the slot 255 on the yoke structure 275 locking cam
280 friction clips on locking cam

DESCRIPTION OF THE PREFERRED EMBODIMENTS

According to certain embodiments as disclosed in this application, a wheeled dolly or hand truck is provided that allows for the easy transport and pouring of a container or bucket across an uneven terrain or surface. A preferred embodiment involves a two-wheeled dolly, which is useful for the transporting and pouring of a bucket, such as a generic 5-gallon plastic bucket or other container. This device is ergonomically designed to minimize work effort by the placement of the load weight, initially slightly rearward of the centerline of the axles when the dolly is at rest, to slightly forward of the centerline of the axles during transport effectively making transport almost effortless. In addition to its ergonomic design, the bucket preferably has a unique ability to rotate a full 180 degrees on its horizontal axis, through the use of a gimbaled circumferential ring, while being held in place by a bucket clasp. This gimbaled structure allows the bucket to empty its contents without having to lift the entire weight of the bucket and its payload.

A dolly according to certain embodiments described herein may comprise three main components rigidly joined by three readily removable fasteners, thus allowing the dolly to quickly and easily be dissembled for transport, then reassembled again at its work destination.

FIGS. 1-6 show an embodiment of a dolly without the bucket. The dolly preferably comprises an open horizontal "C" shaped frame that is rigidly attached to two vertical columns through the use of removable fasteners and a horizontal pivotal circumferential ring with its two protruding posts, which engage the top of the vertical columns. Alternatively, the vertical supports may have vertical slots for the fitment or engagement of the circumferential ring and would be attached to the C-frame ends using threaded fasteners and similar connection devices.

Completing the dolly, an "S" shaped tubular handle body is removably connected to the frame. In one embodiment, one end of the handle body is slipped into a connecting socket on the frame and held in place with a removable fastener, such as a bolt and nut. Other embodiments employ a "T-connector" assembly as shown in FIGS. 1-6 and FIGS. 20-25 to attach the handle body to the frame. Also, two tires are attached to the two axles (removable or fixed). Other shapes for the handle body or type of tires, including but not limited to pneumatic, self-sealing or solid foam, can be used. Either an elastomeric handle grip or a detachable "D" shaped handle can be used to facilitate the pulling of the dolly over uneven terrain, rough surfaces or large objects such as those found when camping or prospecting.

Each vertical support or vertical column can have a female socket or a slot to accept the protruding posts of the circumferential ring. These protruding posts or boss structures can also have a cap, which extends past the outermost portion of the vertical column and helps keep the container holder or ring within the slots on the vertical column.

The dolly may be fabricated of rectangular and/or round steel tubing or stamped steel parts or a combination of several different materials including alloys, steel, aluminum, carbon fiber and other lightweight composite plastic materials; these materials should be sufficient in structure to support the weight of a fully loaded bucket or container. The wheels can be of any size, larger or smaller, and the tires can be pneumatic, solid, semi-pneumatic, cast or molded.

Various optional components of features may be provided that can be utilized individually or in combination depending upon the needs of the user. These additional components and features include: independent wheel suspension; bucket tilt locking device; fold-down kick stand, disc brake lever; disc brake cable; disc brake assembly; motor and a motor drive cover; accessory kit to combine two bucket dollies into a single, side-by-side or double unit. Other embodiments allow a larger version to accommodate and lift standard 15-gallon nursery containers or any other size containers; or a removable shopping basket or a pivotable tray; adjustable towing arm (which can be connected to or integrated with the handle body and have a means for connecting with a vehicle or bicycle, including without limitation: a clamp, hook, or ball/socket attachment); inserts to carry items without lips such as a standard propane tank or a beer keg; customizable ring covers or inserts to allow for carrying smaller or oddly sized containers; rectangular ring and inserts to carry rectangular buckets or pails; and a dolly plate allowing users to carry oddly shaped items in a fashion similar to a standard dolly.

The dolly vehicle described herein may be used either by professionals or amateur "do-it-yourself" homeowners and renters; also, condo-owners, sportsmen, apartment managers, campers or anyone, who wishes to transport a container, over uneven and difficult terrain, will find this vehicle particularly useful.

Certain embodiments of the dolly design can also be used for the mixing and pouring of compounds such as cement, plaster, stucco or food products and the dispensing of liquids such as solvents, water, sand, gravel or any loose bodied material that would need to be poured from a bucket; this device can also be used to transport any object that can fit in a plastic 5 gallon bucket or be constrained by the circumferential ring or container holder.

This embodiment in essence involves a combination of a bucket transportation dolly and a gimbaled pouring device specifically designed to the fitment of a generic 5-gallon bucket, or by combining two of the devices two 5-gallon buckets can be moved simultaneously while still allowing each to be poured separately. It has the ability to transport liquids or solids and has the added ability to pour such objects without the necessity of lifting and holding the weight of a loaded or partially loaded bucket. It also has the ability to quickly and easily breakdown for ease of transportation.

Certain embodiments of the invention may utilize a rigid tubular horizontal C-shaped or U-shaped lower frame member with laterally spaced wheels, which are attached to a pair of vertical columns or supports. A gimbaled horizontal ring or container holder is attached to the top of the vertical columns above the centerline of the wheels and allows the 5-gallon bucket or a similar container to have sufficient ground clearance and the ability to freely swivel and pour its contents. An optional bucket clasp, attached to the rear of the horizontal ring, can help prevent the bucket from falling out of the ring when the bucket is being emptied or when at rest.

For greater stability, two independent wheel assemblies can be attached to the bottom outmost sides of the vertical columns, extending the footprint to the outside of the dolly frame. A handle body is removably attached to the centerline of the horizontal C-frame cross member body using a clamshell or T-shaped connector assembly with a locking-style collar or threaded collar or other securing devices (such as a key or a toothed lock).

For transport, the entire assembly can easily be taken apart into its basic components, with all parts, save the handle, ring and the two wheels, stored in the bucket, allowing for easy storage or transport in any vehicle. The dolly reassembles again in less than a minute once at its desired location.

With oversized wheels and a rigid frame, the bucket dolly can provide the capability to wheel with ease over almost any terrain, while keeping the contents of its bucket horizontal to the ground generally at all times. It is ideally suited, but not limited to the carrying of liquids without spilling, the mixing and pouring of compounds such as cement, plaster, stucco or food products, the dispensing of solvents, water, sand, gravel or any loose bodied material, which would need to be poured from a bucket—all without undue effort so as to prevent any back injury to the user.

A bucket transporting/pouring device comprised mainly of three main structural components, when rigidly joined by the use of removable fasteners, form a bucket-dolly of unique design. The preferred embodiment structure consists of an open horizontal "C" shaped frame, a handle body, two vertical columns from which tires and a horizontal pivoting circumferential ring or a container holder (such as a tray or basket).

1. A tubular "C" or "U" shaped metal frame of such diameter and wall structure as to act as the primary cross member to which all other elements are attached acts as the main load bearing structure.

2. In one possible version, there are two structural vertical columns each are rigidly attached to the "C" shaped metal frame through the use of easily removable fasteners. Each vertical column has a female socket securely welded or formed onto the top inside surface, for attachment of the bucket supporting circumferential ring, a welded circumferential assembly rod extending out the front surface at the base for attachment of the tubular "C" shaped metal cross member and an axle rigidly welded to the bottom outside surface, for attachment of the pneumatic wheels.

Alternatively, the vertical supports could have a vertical slot or receptor at the tip to accept the bucket supporting ring, and one or two holes at the bottom of the support to accept threaded fasteners that would attach to tabs extending from the "C" frame. In this configuration, the axles for the wheels would pass through the "C" frame itself directly below the vertical support members. In the case of smaller wheels, these vertical supporting members would be extended below the "C" frame and the axles attached to the lower portion of the vertical members below the level of the "C" frame.

3. Two wheels of given diameter, each having sufficient strength to support the weight of a fully loaded bucket and frame and are of sufficient size and durability to provide ample ground clearance allowing the bucket to rotate fully above the ground throughout its horizontal axis in all types of terrain including; mountainous ground such as that encountered when working outside while camping, hiking or prospecting, as well as somewhat smoother surfaces such as grass, concrete and asphalt. The wheels slide over the end of the independent axles and are held in place through the use of a quick release fastener at the outmost edge of each axel. The inventors find that fourteen inch wheels work very well, but the size of tires are not limiting.

4. An upper bucket support consisting of a circumferential band whose inside diameter is closely matched to the peripheral lip of a generic 5-gallon bucket and firmly affixed with two round protruding posts (approx. 180 degrees apart), which are of sufficient thickness and stature to support the weight of a loaded 5 gallon plastic bucket.

5. A single "S" shaped tubular handle body consisting of two obtuse angles, each of about 110-130 degrees, with the upper extent having an elastomeric handle grip. There is a small opening in the end of the elastomeric covering allowing the attachment of a rotatable "D" shaped handle (discussed in #6) which can be affixed to the utmost distant part of the handle through a threaded fastener welded in the end of the tubular handle, and is used primarily when the dolly is pulled over uneven terrain.

6. A removable, rotating, D-shaped handle allowing the device to be ergonomically pulled or pushed by the user. The D-shaped handle allows the user to freely rotate his hand altering the relationship of the user to the dolly, especially while pulling, thus allowing for a more relaxed grip and more controlled positioning when the dolly is pulled behind the user. Other sizes or shaped handles can be used.

7. An adjustable bucket clasp, consisting of a slotted metal clip attached to the circumferential band through the means of a friction fitted post, or a threaded wing-nut, and extending vertically over and into the top of the bucket thus holding the circumferential band in place while pouring and preventing the circumferential ring from dropping when the bucket device is at rest.

8. In assembly, the circumferential band, with its slotted clip, is attached by placing the two posts in their respective mating sleeves, which are firmly affixed to the inside or top of the vertical columns. Once the posts are fitted in their sleeves in their respective columns, the circumferential band is secured in place by the rigid attachment of the vertical columns to the tubular "C" shaped frame. In use, the protruding posts act as rotational gimbals allowing the bucket to remain horizontal to the terrain, regardless of the slope and allowing the bucket to rotate on its horizontal axis thusly pouring its contents.

Alternatively, the circumferential band or container holder would simply drop into the vertical slots, notches, grooves, receptors or female parts in the top end of the vertical supporting members or columns. These vertical slots are designed to accept the protruding posts in the band and would be deep enough to prevent the posts from being jarred out of position. The vertical slots will allow the band to freely rotate and, additionally, allow for quick removal and/or replacement of the circumferential band.

9. There is preferably no mechanical fastening of the circumferential band to the vertical columns. In one version of the invention, the distance between the inside of the two vertical columns and the diameter of the circumferential band at the point of the two posts is critical to the functionality of the dolly, as the circumferential band is held in place in its sleeves or slots by the correct spacing of the bottom tubular "C" shaped frame and by the outer diameter of circumferential band measured at the base of the two protruding posts, with just enough clearance added for rotational freedom on the horizontal axis. The distance between the two ends of the frame has some flexibility for adjustment, but it is preferred to stay within tolerances to avoid dislodging the container holder ring from the frame.

10. In one embodiment, the bottom end of the lower extent of the tubular handle is removably coupled through a sleeved coupling, which is rigidly affixed to the centerline of horizontal tubular "C" shaped frame at the base of the dolly frame. The entire handle assembly, including the rotating "D" handle, is affixed to the tubular "C" shaped frame through a pinned, push and turn slot in the sleeve or through the use of a readily removable fastener such as a pin with clip, or with a threaded bolt and wing-nut. Other suitable attachment connectors can be used.

While certain embodiments are described as having a C-shaped or U-shaped frame, this particular shape is not intended to be limiting. Other shapes and configurations may be used, but the frame should preferably allow a sufficient amount of area or space for the container or bucket (within the gimbaled or pivoting container holder) to pivot and tilt from a first upright position to at least one second dumping or tilted position. A C-shape or U-shape is the most convenient shape for the frame; these shapes allow use of a strip, tube or rod of strong material (including without limitation: metal, alloy, bamboo or wood fibers or plastics). This type of frame may generally have a center portion and two generally terminal ends. The terminal ends of the frame can also have detachable bumpers or LED lighting or headlights.

As described above, a handle body is preferably attached or secured to the center area of the frame; this handle body can have a first handle body end and a second handle body end; the second end is connected to the frame; the first end can have a integrated handle or any other type of handle structures (including without limitation ergonomic attachments or D-shaped handles).

The second end of the handle body is connected to the frame using a sleeved coupling or two piece clamp or "clam shell" system that is held in place with screws and bolts or a locking collar or a threaded collar. This sleeved coupling attachment has a first or upper connection part and a second or lower connection part; each first and second connection parts are removably secured using screws, bolts or some type of friction locks/clamps (similar to closures on old pickling jars). The first and the second handle body connection parts (sleeve parts) sandwich the second end of the handle body and a portion of the frame. This sleeved coupling can have at least one hole through the coupling that would mate with an associated hole in the frame and/or second end of the handle body for a more secure connection with a threaded bolt or pin.

Other removable yet secure attachment systems can be used. For example, the frame can have a receptor end that engages with the second end of the handle body; this type of engagement can be a male/female type engagement. FIGS. 1-6 and 21-26 show another possible T-connector locking assemblies. The handle can also be secured off center or anywhere along the back of the C-shaped frame, especially when two dollies are connected in the double carrier configuration.

A kick-stand or other adjustable stands can be connected to the frame or the connection point of the frame and handle body. The handle or the first end of the handle body can also have a light or a horn. The handle can be padded or have a gripping surface. The vertical support structures (which can be made from metal, plastic, wood or alloys, etc.) provide support and a connection structure for the gimbaled or pivotable container holder at the first or top end; the vertical support also has a second or bottom end to connect to the C-shaped frame and the supporting wheels.

In other embodiments, the vertical support has a first vertical support end and a second vertical support end. The top end or the first vertical support end has a slot, notch, groove, receptor or female engagement area. Other versions could have this first or top end of the vertical support be a male engagement area or boss, which would correspond with a corresponding receptor structure on the container holder. This top end of the vertical support can also have a sliding cover that moves from a first open position to a second closed position.

This female socket or slot or notch can have differing widths; the top portion can have a slightly narrower width than the base portion of the notch. This slot or notch can also be lined with a flexible rubber or plastic material, cover or lining (i.e. with a different durometer than the rest of the vertical support). This slot or notch can also be the female part to connect with the pivoting boss structure on the container holders.

Other versions of the top portion of the vertical support could have a one way clip or carabineer-style lock (metal loop with a sprung swinging gate or screwed gate) to help retain the boss or male piece from the container holder within the notch/slot of the vertical support top end and until the user desires to disengage the male piece (of the container holder assembly) from the vertical support.

The bottom end or second vertical support end comprises: at least one hole to accept the wheel axle or another connection device to secure the vertical support to the terminal ends of the frame and to the wheels. In other versions, the second or bottom end of the vertical support has a first, second and third hole; the first and the second holes of the second vertical support end are oriented perpendicularly to the third hole of the second vertical support end; the first and the second holes of the second vertical support end are parallel with respect to one another.

The terminal ends of the frame are connected to the vertical support through the third hole of the second vertical support end. Once the end of the frame is inserted into the third hole in the lower vertical support end, the first hole allows a bolt or screw to clamp the two sides of the vertical support lower end together. The second hole on the vertical support end allows a bolt or axle to connect to a wheel, track, ski or other transportation part.

Other embodiments allow the first and the second holes to be on the same plane or elevation as the third hole, but this configuration would require holes to be drilled through the terminal ends of the frame to allow passage of the axle or securing bolts through the first and the second holes of the vertical support's lower end.

The vertical support structures can have grooves and ribs; in a plastic molded version, these grooves and ribs were placed to reduce material costs; however, other cross-struts, braces and trusses can be molded into the vertical support structure.

For the orientation of the second hole (axel for wheel), the wheels of the dolly are preferably attached to the right and left frame members or onto the vertical supports, through holes located in the vertical supports. Also, the wheels can also be attached at the base of the vertical supports, via separate right and left axles inserted into holes at the base of the vertical supports. The wheels can be attached with threaded nuts, threaded locking fasteners or other suitable attachments.

The hole on the lower part of the vertical support may be slightly offset from the notch/slot on the upper vertical support end; this offset nature of the second hole for mounting the axle for the wheels allows for a better operation of the device (i.e. tilting and pivoting of the gimbaled container holder from a first upright position to at least one second angled or dumping position). However, other embodiments may allow for non-offset alignment of the top portion (notch) of the vertical support and the wheel axles.

In one preferred version, these three holes on the lower part of the vertical support member allow the manufacture and use of one universal vertical support part that can be used on either side of the frame; in other words, the parts can be flipped or turned around to be used on either side. This universal part affords greater cost and material savings.

Other versions of the vertical support can simply have one hole centrally located and oriented on the same axis as the notch on the first vertical support end. There will be a second hole perpendicularly oriented to engage the terminal ends of the frame. Other versions can use spring locks, clasps or clips or welds to help secure the ends of the frame to the vertical support.

Finally, specific left and right sided vertical support pieces can also be used; namely, each side would be tailored with the proper wheel axle hole placed slightly behind the upper end notch or slot of the vertical support body Depending on the user's preference or the type of container, the container holder can be contiguous without a opening or open like a crab claw. In FIG. 1-6, the container holder is shaped as a circular ring; in FIG. 28, there is a first side and a second side of the ring container holder; each side of the circular ring or half circle sandwiches a pivot connector that has a boss, post, male part (15) or protrusion that pivotally engages the first or upper end of the vertical support. This pivot connector has at least one hole or opening to allow a connection screw or bolt to help secure the pivot connector with the two sides of the container holder; other shaped container holders can be used, including without limitation, square or rectangular shapes.

In other possible embodiments, the container holder can be continuous and have an integrated male piece or pivot connector or boss that engages the female part (slot/notch) on the top end of the vertical support. In another version, this male pivot connector piece could be integrated on a U-shaped clip that engages the container holder body; the container ring body would slip into the U-shaped clip; an additional bolt or screw could secure this male connector piece to that particular location on the ring body.

Other types of container holder can be used including, open "crab claw" versions with a support or lock; the container holder can be open at the forward or front end and have two terminal ends that will form a friction lock around the intended bucket or container, see FIG. 38.

The shape of the container holder can roughly mimic the C-shape or U-shape of the frame; the container holder has a container holder body with a center and two terminal ends; these terminal ends of the container holder assembly can be bent slightly outwards to create a grasping or friction lock edge. The center portion of the container holder can also have a bucket clasp or lip holder to help hold the container/bucket within the holder or to help avoid unwanted vertical "up and down" movement.

Another version of the container holder allows use of a multi-piece holder design; the dominant or rear portion of the holder (half circle shaped) is one of the circular holders; there are pivot connectors, which have a boss, post or protrusion that pivotally engage, the first end of the vertical support; and grasping ends. The grasping ends and the half circle shaped container holder sandwich the pivot connector structures, which can be secured with bolts, screws, glue or other secure connection means.

The container holders can also be customizable insert. A user can also employ a customizable insert for odd shaped containers, which do not appropriately mimic the size and dimensions of the standard container holder. For example, a insert disk can be cut to a particular container shape and placed into the container holder; then, the container can be placed into this insert disk space, including irregular shapes.

This type of container holder or engagement device allows for use of the dolly with heavy containers or containers or buckets that are already filled with material, and the user will not need to lift the container/bucket over and into the container holder as with above mentioned versions of the container holder.

This invention allows for different sized containers such as 5 or 15 gallon versions for the dolly apparatus. These types or sizes of containers are not intended to be limiting but rather listed as examples only. The invention allows for many different variations for this dolly with relatively few components; these components can be part of the dolly kit or accessory kit.

To maximize the tilting ability of the pivoting container holder, the mounting of the container holder within the frame and above the frame preferably should allow the tilting of the container/bucket and also allow enough vertical clearance of the bottom of the container/bucket from the ground (so as to allow easy movement of the apparatus across the ground surface).

Wheels, skis with springs (or other suspension components, such as struts or shocks), tracks or other rolling or sliding transportation parts are connected to the lower end of the vertical support. To improve tilting ability of the pivoting or gimbaled container holder, wheels can be placed slightly behind or off center of the notch in the top portion of the vertical support. However, other variants allow for other orientations of the wheels in relation to the notch or slot or mounting point of the container holder to the top of the vertical support.

Figure 32A:
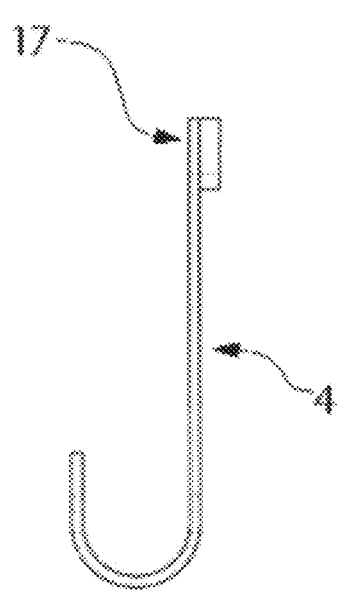
FIG. 32*a*, 32*b* show another version of the vertical support with a J-shaped lower or second end.
Figure 32B:
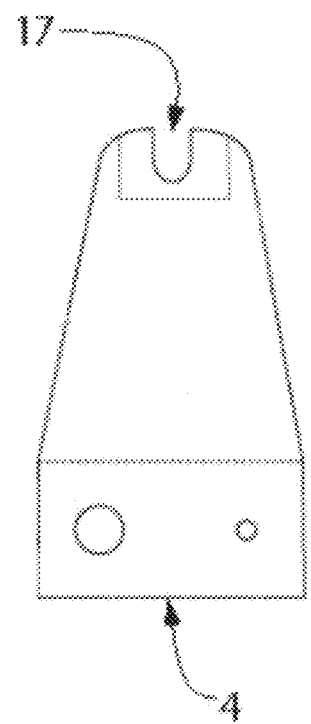
Figure 39:
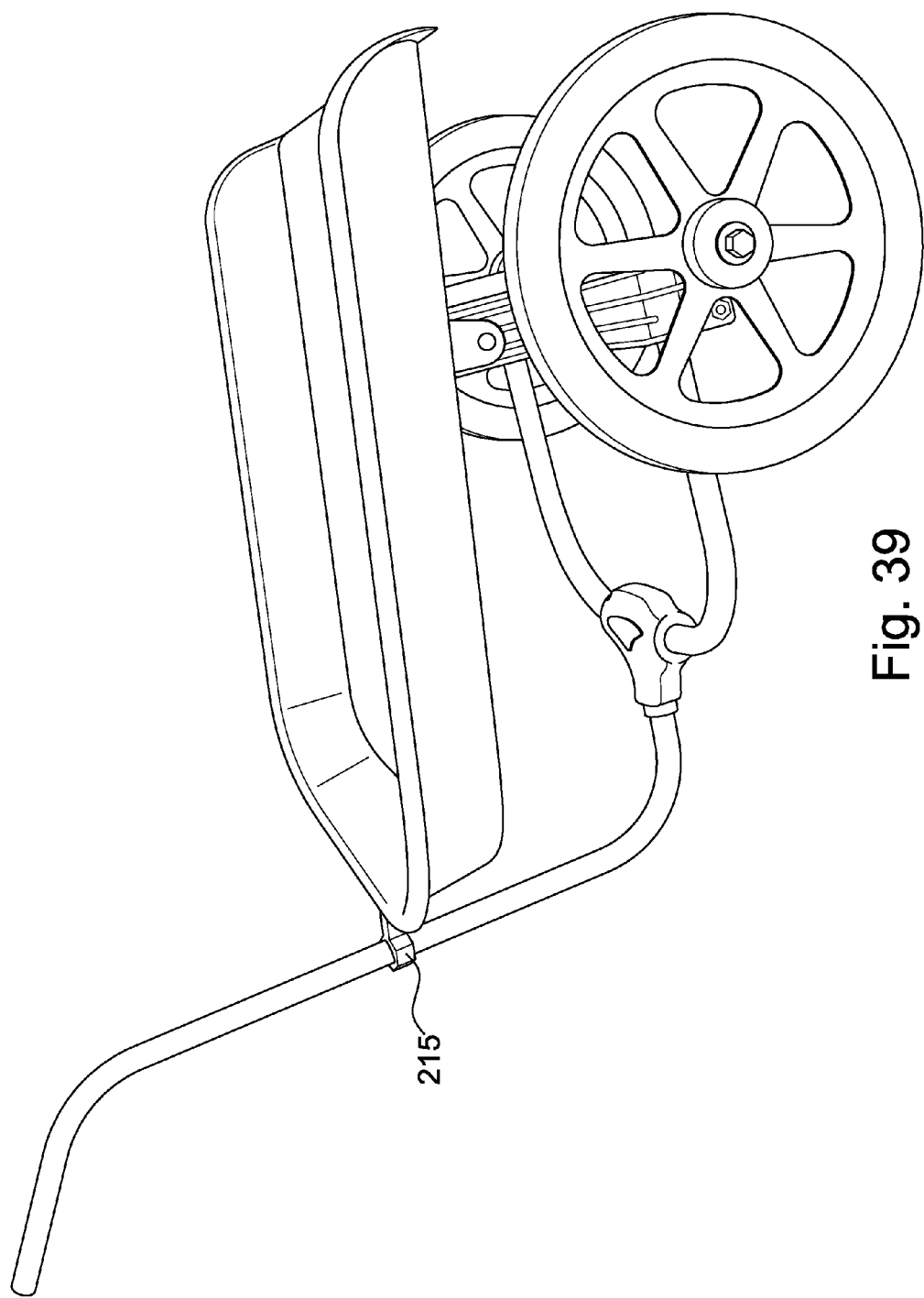
FIG. 39 shows an embodiment of the invention with a garden tray attached to the vertical uprights and to the handle body.

The vertical support can have a first vertical support end and a second vertical support end; the first vertical support end has a slot or notch; the second vertical support end has a flange and a flange opening; the first and the second frame ends are connected to the vertical support through the flange; an axle engages the frame ends and the flange of the vertical support; a wheel is connected to said each axel; the slot of the first vertical support end engages a pivoting container holder; whereby the container is placed within said pivoting container holder. Note that the flange can be an upwardly facing "J-shape". The terminal ends of the C-shaped frame would fit within or engage the "J" area of the lower portion of the vertical support (see FIG. 32).

Other versions of the vertical support can have the second or lower end be J-shaped or C-shaped and form an upward flange, wherein the terminal end of the frame can lie and fit. Further, the hole on the second end of the vertical support and the hole on the terminal end of the frame allow an axle or screw or rod to pass through the flange structure and the frame end to allow a wheel to be connected to the apparatus. Other suitable means to secure the wheel to the axles can be employed, such as pins, locks, threaded nuts and spring locks, etc.

In other versions, there is a first or top end with a notch/slot for engaging the pivoting male piece for the container holder; there is a second end with at least one hole for engaging a mounting bracket on the frame ends or the frame ends directly. Bolts, screws, pegs or other components can firmly secure the vertical support lower end to the frame ends.

In one vertical support, some example dimensions are: height (8.625 inches), width at second end (3.213), narrowest width of slot (0.499), widest width of slot (0.600), and depth of slot (1.000); these dimensions are for example and are not intended to be limiting.

The first end of the handle body can also be fitted with a coupling attachment to connect to a bike or other type of vehicle for towing. There can also be pivot points and clamps at the connection to the bike and also at the connection between the second end of the handle body and the frame. At the first end of the handle body, there can be a means located at the first end of the handle body for connecting to a vehicle, including without limitation: a clamp, a ball or socket connector, carabineer and a hook. Other versions combine multiple container carriers together to allow more than one bucket or container to be transported by one user (in a side by side configuration). Further, a third wheel (not shown) could also be integrated between the left and right bucket carriers.

Other invention types show the vertical support, which allows movement up and down but also around the axis of each vertical support. The container supports are separate pieces with a first side (container engagement side) and a second side (having the male piece to engage the top of the vertical support). The male pieces on the second side engage or connect a hole or opening on the top of the vertical support.

This vertical support has a first or inner component and an outer component; there can be an internal spring or hydraulic system that allows movement up and down within this vertical support outer component. In addition, at a different elevation, the container support can be locked so that there is no more rotational movement. At another elevation, the container support can rotate a substantial amount around the axis of the vertical support axis.

A chain or strap can be used once the bucket is "snapped" in or engaged to the container holder to prevent the bucket from being jarred out of the split-ring or container holder. The container holder pegs or bosses can also have cap ends that have flanges that extend outwardly from the boss surface that engage the outer surface of the vertical supports.

In FIG. 29, this dolly can be adapted to carry a shopping basket. The boss or male piece in the previous versions of the pivoting or gimbaled container holder can be also integrated into a shopping basket; the male piece or rod that connects the basket handle to the basket body can also be the male piece connector to engage the slot on the top or first end of the vertical support.

In FIG. 30, this dolly can also be adapted to carry any type of insert that has terminal ends with male pieces to engage the slot or notch on the top of the vertical support. This flat insert could also have a adjustable ramp to help guide or slide underneath a heavy container or object.

FIG. 31 shows an insert that can be placed into and integrated with the container holder. For containers or objects that do not have a lip, rim or flange that extends over and outside the circumference of the body of the container, such as propane tanks or beer kegs. This type of insert with a body, a central portion, which should be relatively flat or mimic the bottom of the item to be carried, and at least two arms or ends (or multiple arms/ends) with flanges or hooks that grip about the container holder. Further, there can be more than two terminal ends, such as three or four arm configurations. Other configurations of these types of inserts can have three arms or ends that still leave the front or front portion open ended.

A cap or cover can slip over the upper or first end of the vertical support after the user places the male part within the notch/slot. This cap or cover can help retain the male part of the container holder within the slot/notch. Another possible easily closed structure can be a lockable and swinging gate for the top of the vertical support. This gate would have first closed position and at least one second and open position.

According to various embodiments disclosed within this application, an apparatus for transporting a container or load comprises a horizontal "C" or "U" shaped frame cross member and two rigid vertical gimbaled columns instead of a central back bone from which a bucket would be supported. This design allows the bucket to tilt a full 180 degrees on its horizontal axis in order to effortlessly dispense its contents; this design also significantly reduces the work effort required to place the dolly in a travel mode by placing the initial load directly behind the fulcrum point of the axle.

While at rest, the load is already positioned just slightly behind the centerline of the axles requiring only the slightest force to lift the vehicle to its travel mode. In travel mode, the load pivots forward and remains slightly in front of the centerline of the axles, thus requiring no lifting force by the operator to keep it there.

Unlike conventional wheeled dollies, a wheeled dolly or hand truck, according to the embodiments disclosed in this application, may have an open, rigid, horizontal "C" shaped frame structure to which the axles are rigidly attached directly to the vertical columns, which act as the central load-bearing members of the device. The load weight is positioned directly on or substantially on the wheels through the axles, and the "C" shaped frame simply provides a very rigid connection between the two widespread wheels and allows a place to attach a handle, which bears no load weight but that of the handle and the dolly frame alone.

Another unique part of this design is the use of large, strong connectors at the main contact points and the minimal use of other structural parts, limiting those to the handle, the circumferential ring, and the two connections that connect the "C" shaped frame to the vertical columns. The minimalistic use of connections also allows for quick and easy disassembly and assembly for ease of transportation or storage, while the oversized connectors, provide the strength and rigidity not seen with similar, latterly wheeled units, specifically those consisting of a singular backbone and one central primary connector serving as the main weight bearing member.

In use, a bucket or a container, including but not limited to a typical 5 gallon plastic bucket, can be placed into the circumferential ring or container holder, and the bucket clasp is attached. The bucket may then be filled with its contents, and the handle is tilted forward where the entire weight of the load is transferred through the gimbaled posts directly into the upright vertical columns and out to the two wheels.

Alternatively, the container holder may employ a latch or latching structure, such that the container holder can be "opened" to wrap around or otherwise encompass a filled container, and then latched or otherwise locked to secure the holder about the exterior circumference of the container.

Preferably during the use of the dolly invention, the weight of the bucket remains on the same axis as the wheels and is not transferred through the handle to the operator. Once the user moves the dolly to the desired location and place, the operator simply lowers the handle until it rests on the ground and tilts the bucket forward to empty its contents.

The disclosed embodiments of the apparatus for moving a container or a load have been devised to offer a significantly easier method of transporting, handling and dispersing the contents of one or more generic 5-gallon plastic buckets or any other type of container. With the commonality of the 5-gallon plastic bucket today, this device will be found practical and useful to anyone who transports material (solid or liquid) using such buckets or similar containers.

This dolly or hand truck may also find use in the transport of tall cylindrical objects, which can fit in the confines of a 5-gallon (or other sized) bucket, such as rolls of roofing paper or in a nursery for hauling small trees.

According to various embodiments, a significant advantage of the dolly or hand truck is that the weight of the container, which is being transported, is supported by the wheels and not the user. As a result, the user need only generally provide sufficient forward force to overcome any resistance of the wheels (or other motive means, including but not limited to tracks or skis) against the ground to enable forward or rearward movement of the apparatus. Unlike conventional dollies, the user need not continuously exert effort to maintain the weight of the bucket or container off the ground. Rather, because the bucket or container does not lean on the frame of the dolly, the wheels (or tracks or skis)

generally provide all the necessary support for the bucket or container when the apparatus is in motion.

In other words, the pivoting point of this new dolly or hand truck allows the majority of the weight of the bucket or container to be supported by the wheels. This is very different from a traditional dolly, which requires the user to be part of the "tripod" structure of the traditional dolly and to support a majority of the weight of the item being moved.

This wheel bearing weight aspect is a significant improvement over other dolly devices since it reduces the amount of manual effort needed to transport heavy buckets or containers. Preferably, the wheels of the dolly or hand truck are located slightly behind the notch/slot on the top portion of the vertical support to better enable the functioning of the gimbaled and pivoting container holder. The unique design of the dolly, particularly when employed with oversized wheels, allows the dolly to be easily pushed or pulled over almost any terrain using only one hand; thus, this invention frees the other hand for carrying other utensils (a mop, shovel or other related implements).

This design accommodates any size wheel (large and small) by reducing or increasing the height of the two vertical support members. For example, smaller wheels may require that the vertical supports extend below the C-frame to allow for the bucket to be lifted clear of the ground. The dolly's minimalistic design makes it simple to disassemble and assemble again for storage or transportation without the use of any hand tools.

The dolly or hand truck design also may reduce or eliminate the wear and tear on the user's lower back as the bucket can be placed in the dolly, prior to being filled with material, and its contents simply tilted out from the bucket instead of being manually hoisted and dumped.

The dolly or hand truck may be assembled with a container holder, which has two protruding posts or bosses, which engage the two corresponding receptors (including but not limited to slots, notches, female parts or sockets) of mechanical supports, which are located on either side of the rigid frame of the dolly.

In one embodiment, the tubular "C" shaped frame, which has forked frame members, is connected to the lower portion or base of two vertical supports and are held rigidly in place by removable fasteners and makes the container holder, the two vertical columns and the "C" shaped frame member into one single assembly. Also, attached to the outside section of each vertical column is an axle, which can be rigidly welded or securely attached at 90 degrees to the outside vertical face upon which the wheels are attached through the use of a readily removable fastener on the outermost end of each axle.

Completing the assembly in this example, the tubular handle is inserted into the sleeve on the centerline of the "C" shaped frame and snugly attached through the use of a readily removable fastener (such as a threaded or locking collar). Disassembly is quick and can take less than a minute, and reassembly would take an equal amount of time and follow the reverse order described above. Other embodiments add a braking system, a suspension system, and/or a motor.

With a proper coupling attachment, a vehicle, bicycle, electric cart and motorcycle can tow this dolly and increase the effective range of the bucket dolly. With the addition of a simple structural connector, two dollies can be mated together to create a two-wheel dolly that can carry two 5-gallon buckets at the same time; this version can have either one centered handle or two handles, which are centered on each C-frame.

Special shopping baskets can be made with interior posts that would rest in the vertical supports, which allow the basket to stay level, while being transported using the dolly. Other inserts fitting into the pivoting container ring would allow the transport of propane tanks, square pails or buckets, or tool pouches. Such inserts comprise an insert body and a first insert body end and a second insert body end; the first and the second insert ends being hook shaped or having grasping flanges or lips.

A dolly plate can be fitted onto the vertical supports allowing for transport of items slid onto the plate as you would with a standard vertical dolly. Another option of the dolly plate may keep the apparatus from pivoting (with respect to the vertical columns).

By increasing the size of the wheels and the width of the C-frame, the design can accommodate a standard 15-gallon nursery container. The pivoting ring would be sized accordingly and have an opening to allow the vehicle to be pushed up to and around the container. The ring would then close around the container to hold it securely. In this design, the pivoting ring posts would be moved to a position forward of the axles of the wheels when the device is at rest. During transport, the handle of the vehicle would be pushed down to lift the container and center its weight over the wheels. By using the leverage advantage of this design, extremely heavy containers can be lifted and transported with minimum physical effort.

As shown in FIGS. 21-26, there is a locking connector or "T-Connector" that enables a secure but removable connection between the C-Frame and one end of the handle body. The T-Connector has a first or top portion and a second or bottom portion. The first and second portions of the T-Connector are mating pieces and form a clam shell type of arrangement. Near the first end of the T-connector, which is closest to the C-Frame, there is a first channel or groove for the C-frame. The portion of the C-Frame that engages this T-Connector lies within this first channel or groove.

Extending in a perpendicular orientation to the first groove or channel is a second groove or channel for the handle end; this second channel will extend to the second end of the handle body. Within the second channel or groove, there is a parallel oriented third channel or groove or "pin channel;" this pin channel receives and mates with the pins or bosses on the end of the handle body. Further, there is a fourth channel or mating groove (female groove) for engaging with the boss structure, which is on the inside of locking collar.

Near the second end of the T-connector, there is an indented neck area that allows for the rotating locking collar. This locking collar can have a first or top portion and second or bottom portion. There can be boss structures on the inside surface of the first and second portions of the locking collar. As noted above, these boss structures can engage the fourth channel or mating groove on the first or the second portions of the T-connector.

The locking collar engages the neck area of the T-Connector to assume a first or locked position and can move to a second or unlocked position. In one preferred embodiment, the movement is only in one direction, but other embodiments may allow for rotational movement in two directions. This rotation is around the axis, which is parallel to the second channel.

To release the handle portion from the locking mechanism, the user simply turns the locking collar from the first (locked) position to the second (unlocked) position. In the first (locked) position, the pins or bosses on the handle are unable to move along the length of the third channel because the boss(es) on the inside of the locking collar impedes movement out of the third channel (pin channel).

In the second (unlocked) position, the boss(es) on the inside surface of the locking collar pieces are moved so that the boss(es) do not impede movement of the pins from one end of the handle body and along the third channel. The user is then able to remove the handle body from the locking connector.

FIGS. 21-26 show an alternative embodiment of this locking collar and locking connector. There are two bosses centrally located to block the pin of the handle from moving within the second channel; in this embodiment, a fourth channel may not be required. Further, other embodiments of the locking collar can use a simple threaded connection.

Figure 2:
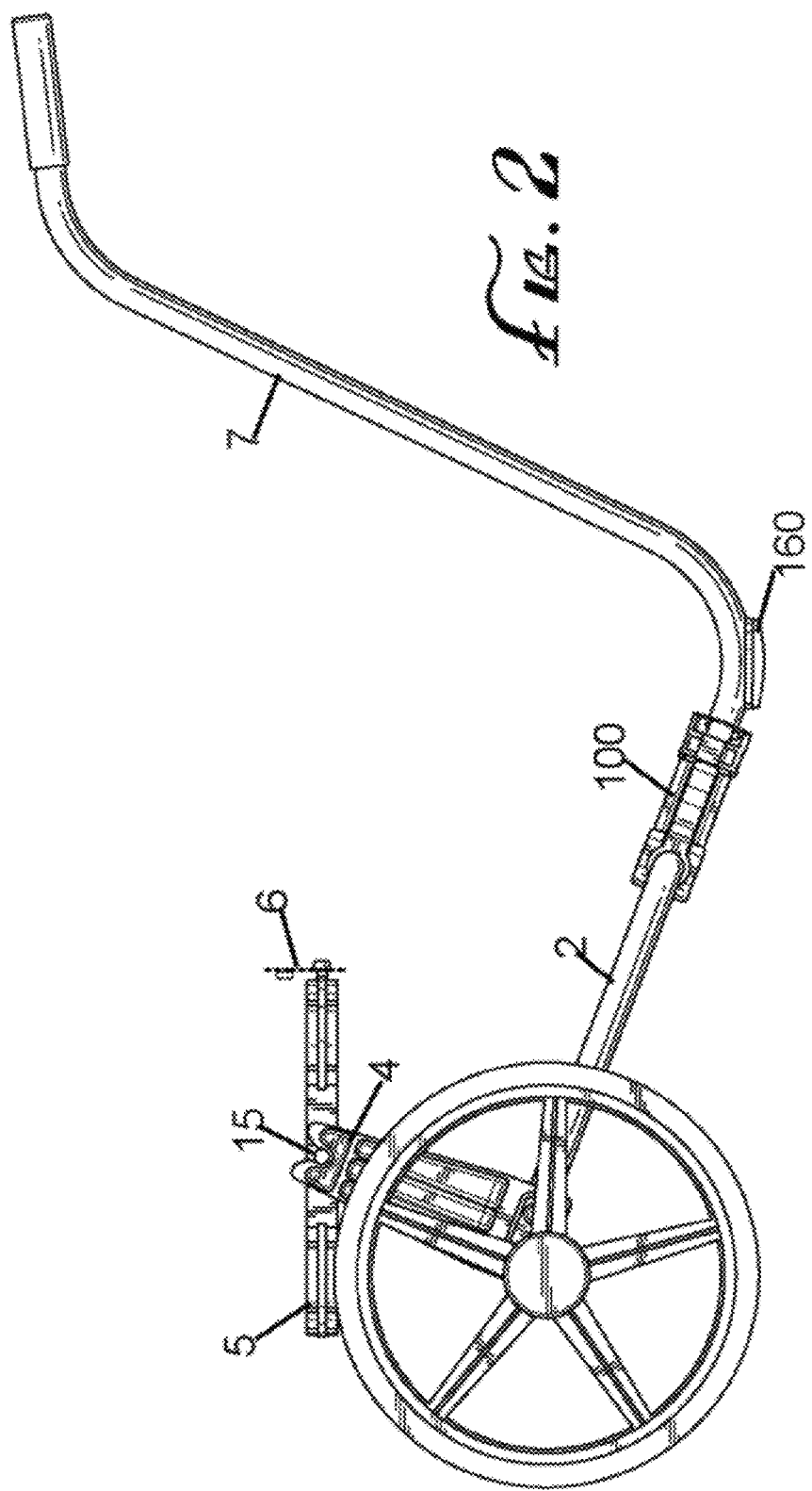
FIG. 2 is a side view of the dolly or hand truck of FIG. 1.
Figure 7A:
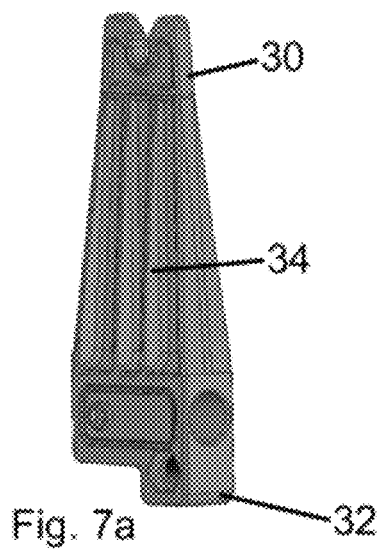
FIGS. 7a, 7b, 7c and 7d are views of one embodiment of the vertical upright support.
Figure 7B:
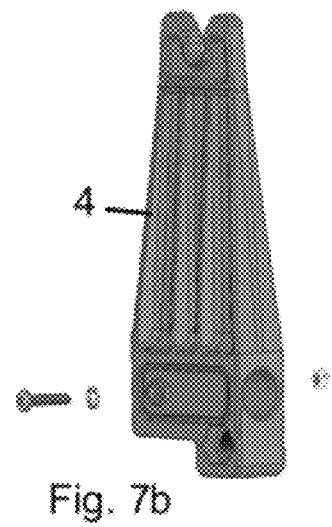
Figure 7C:
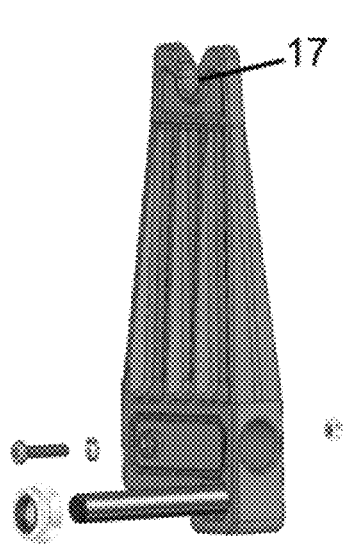
Figure 7D:
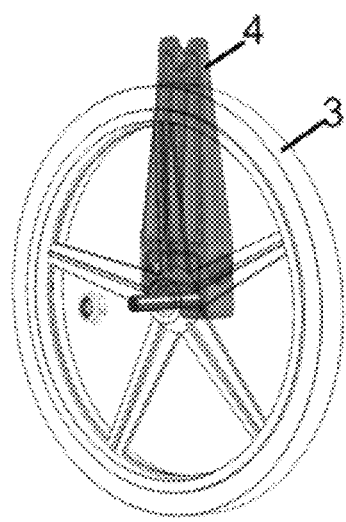
Figure 11:
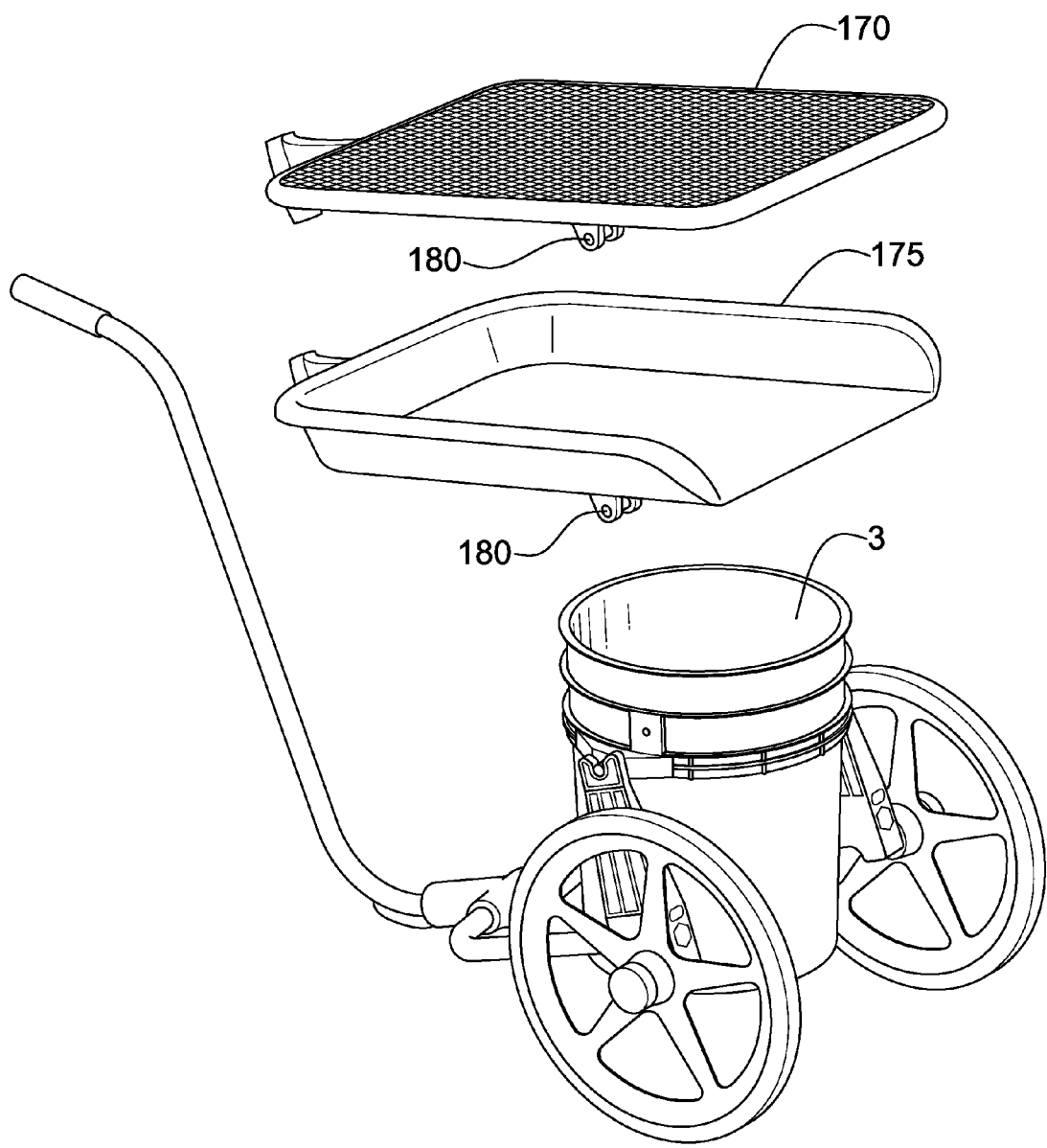
FIG. 11 is a view of various modular attachments to the invention, including the container holder and two types of trays.

As shown in FIGS. 1-2, there can also be a handle body skid pad on the portion of the handle that contacts the ground, when the mobile dolly is at a rest position. This handle skid pad can be comprised of rubber or other durable materials, including bamboo or wood or leather or recycled tire pieces.

As shown in FIGS. 13-19, there is a yoke connection apparatus to connect optional trays and components to the handle. The yoke apparatus comprises a mounting bracket to the accessory or tray; a yoke structure; and a handle collar and lock.

The bracket or mounting bracket has a first or mounting side (to attach to the accessory tray) and a second or yoke attachment side of bracket. The bracket can be securely attached to the accessory tray or component using glue, hook/loop connectors, screw, bolts or the like.

The yoke structure has a first end and a second end of yoke; the second yoke end engages the handle collar and lock. The yoke has a top or first side and a second or bottom side.

The bottom side of the yoke has an engagement area that mates to the handle collar. This engagement area can be a tooth or a boss that acts as a male component to a corresponding female component on the handle collar structure. Alternatively, this engagement area of the yoke can be a slot or female structure that mates or engages a corresponding area or tooth or boss on the handle collar.

To connect the yoke apparatus to the handle, there is a handle collar and lock. In the preferred embodiment, the lock is a locking cam that can pivot about one end from a first or unlocked position to a second or locked position.

The handle collar has a first piece and a second piece; in the preferred embodiment, the first piece and the second piece sandwich the handle. The handle collar has an engagement area or tooth that engages the slot on the yoke structure; there is also a pivoting or rotatable lock or locking cam. There can also be friction clips on the side of the locking cam.

To operate this yoke apparatus, after mounting the first and second sides of the handle collar and locking cam around the handle, the user places the second end of the yoke into the engagement area of the handle collar so that the mating pieces of the yoke and the handle collar align and catch.

As shown in FIGS. 14-20, the mating pieces or teeth and slot on the yoke and handle collar substantially prevent horizontal movement of the yoke and handle collar after engagement. To prevent vertical movement of the yoke end from the handle collar, the user will move the locking cam from the second or unlocked position to the first or locked position. This cam lock pivots about one end that is connected to the handle collar; the sides of the cam lock have at least one spring or clip that engages the handle collar in the first or locked position; this is a type of friction lock.

Figure 12:
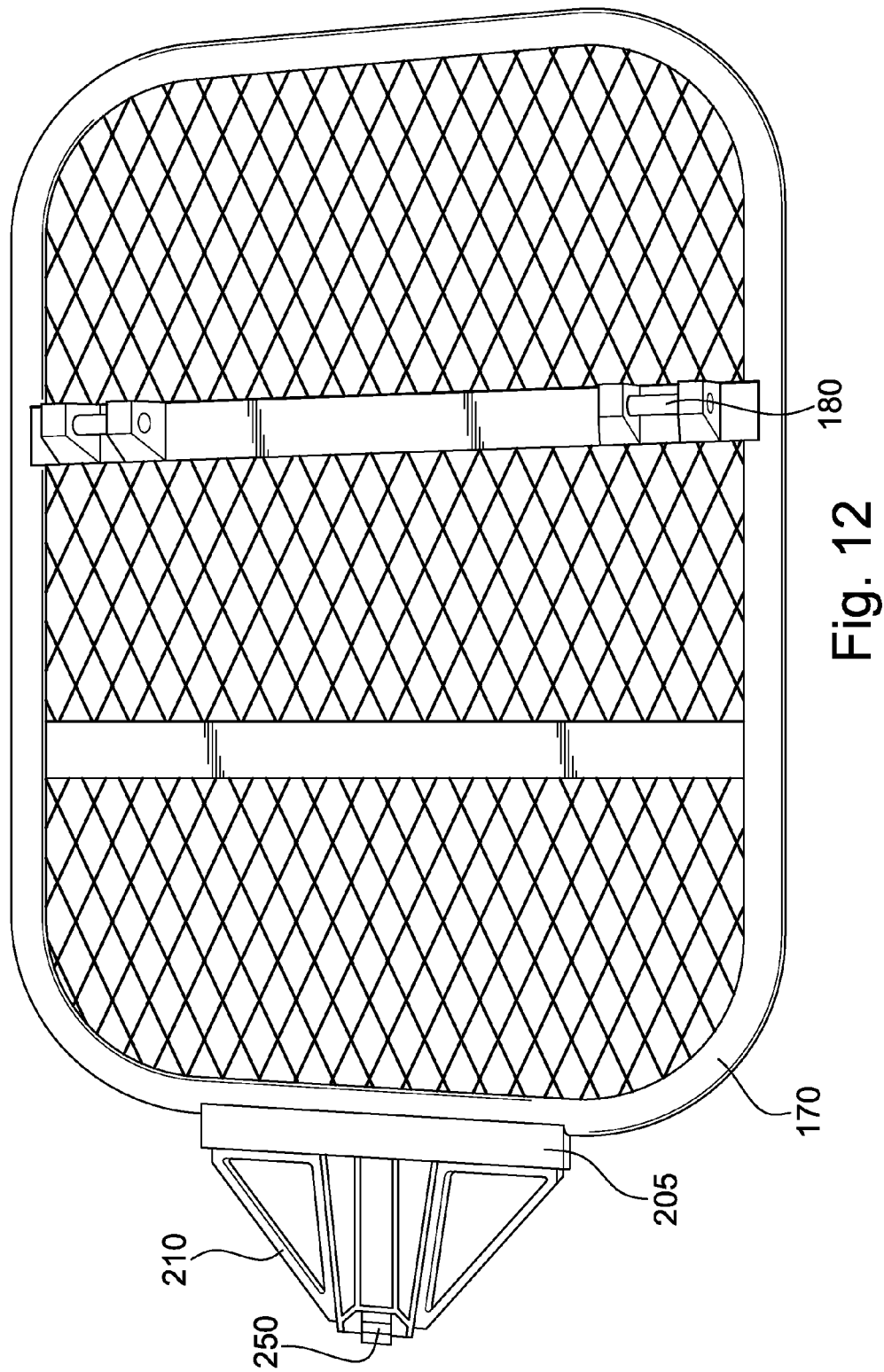
FIG. 12 is a bottom view of the "pro tray" or container holder.
Figure 27:
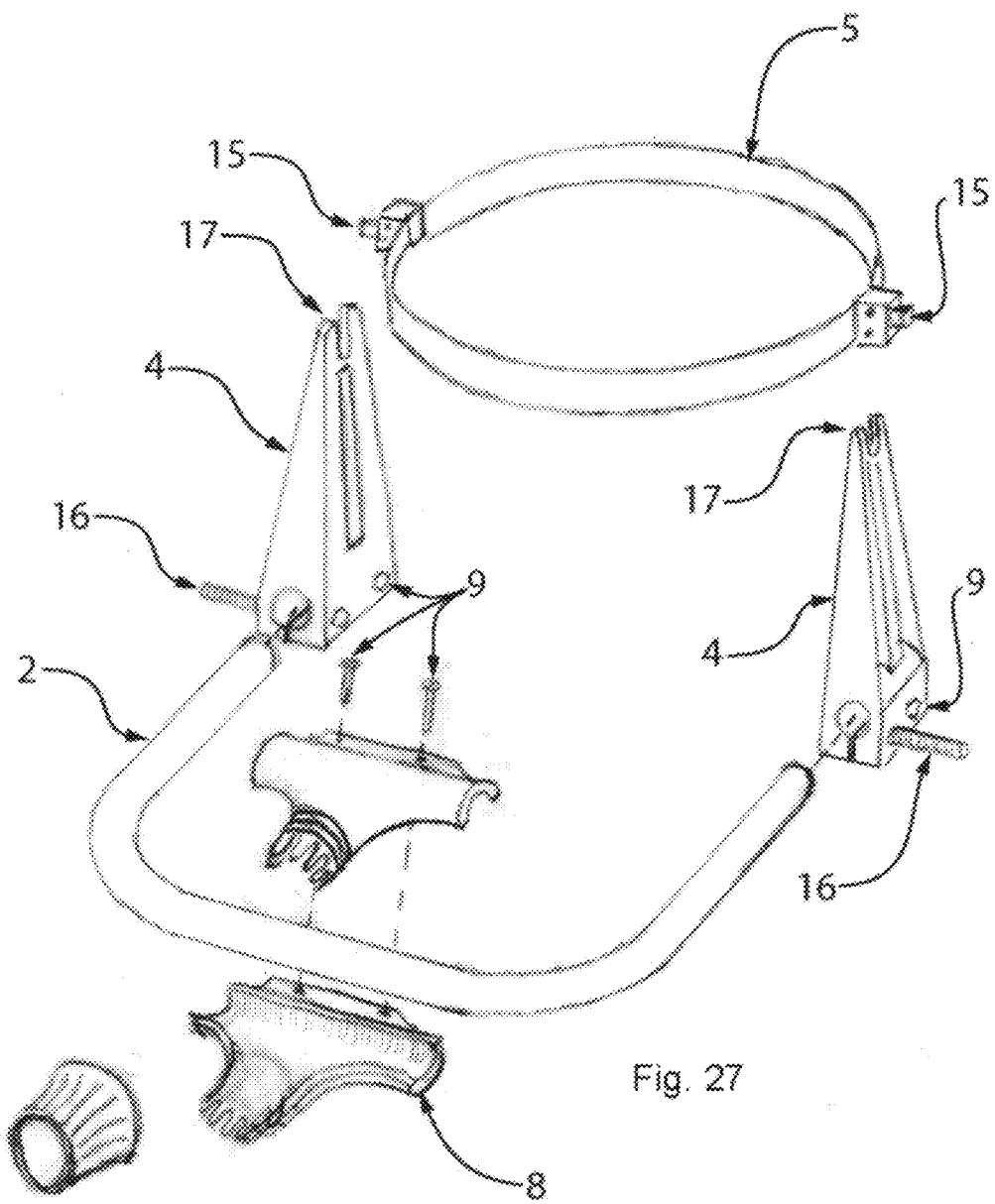
FIG. 27 is an exploded view of another embodiment of the invention.

As shown in FIG. 12, there is an accessory tray component or "pro-tray". This tray has a first side (top) and a second side (bottom); the tray can be made of a sturdy mesh material (metal or plastic) and can also have multiple of openings or ridges. The second or bottom side has male structures or connectors that fit within the slots on the first end of the vertical uprights or supports on the main apparatus. The tray can be fixedly attached to the yoke bracket for mounting to the yoke and handle collar apparatus.

As shown in FIG. 13, there is an accessory component or "garden tray". This tray has a first side (top) and a second side (bottom); the tray can be made of a sturdy material (metal or plastic or wood). The second or bottom side has male structures or connectors that fit within the slots on the first end of the vertical uprights or supports on the main apparatus. The garden tray can be fixedly attached to the yoke bracket for mounting to the yoke and handle collar apparatus.

In another version of the invention, the second vertical support end comprises: at least one hole to accept the wheel axle or another connection device to secure the vertical support to the terminal ends of the frame and to the wheels. The second or bottom end of the vertical support has a first, second and third hole; the first and the second holes of the second vertical support end are oriented perpendicularly to the third hole of the second vertical support end; the first and the second holes of the second vertical support end are parallel with respect to one another but are placed a different elevations; the second hole for the wheel axle is lower than the first hole to secure the vertical supports to the end of the C-Frame. There are several alternative connections to put the attachment devices to the handle body, including locking hooks or clamps or clasps or clips (male/female connections).

An apparatus for transporting an object comprising: a frame, which has a first frame end and a second frame end and a center; a handle body, which has a first handle body end and a second handle body end; the first handle body end is a handle; the second handle body end is removably connected to the frame; the first and the second frame ends are each connected to a vertical support; each said vertical support has a first vertical support end and a second vertical support end; the first vertical support end has a slot; the second vertical support end comprises: a first hole of the second vertical support end; a second hole of the second vertical support end; the first and the second holes of the second vertical support end are oriented perpendicularly with respect to one another; the first and the second frame ends are connected to the vertical support through the second hole of the second vertical support end; an axle engages the first hole of the second end of said each vertical support; a wheel is connected to said each axle; and the slot of the first vertical support end engages a pivoting container holder; whereby the pivoting container holder supports said object.

The first and the second handle body connection parts sandwich the second end of the handle body and a portion of the frame; and there is a means located on the first and second handle body connection parts for locking the handle body to the frame, including without limitation, a locking mechanism that can rotate from a first locked position to a second unlocked position or the reverse order. Each said second vertical support end is connected to an axle and a wheel; the first and the second frame ends are connected to the vertical support; and the slotted receptor of the first vertical support end engages a pivoting container holder; whereby the pivoting container holder supports said object. The pivoting container holder can be a tray and have at least two connection points for engaging the slots on the vertical supports. The second vertical support end can have a flange; the first and the second frame ends are connected to the vertical support through said flange.

Detailed embodiments of the present invention are disclosed; however, it is to be understood that the disclosed embodiments are merely exemplary of the invention, which can be embodied in various forms. Specific structural and functional details disclosed are not to be interpreted as limiting, but merely as a basis for the claims and as a representative basis for teaching one skilled in the art to variously employ the present invention in virtually any appropriately detailed structure. Further, the terms and phrases used are not intended to be limiting; but rather, to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. Any element in a claim that does not explicitly state "means for" performing a specific function, or "step for" performing a specific function, is not be interpreted as a "means" or "step" clause as specified in 35 U.S.C. Sec. 112, P6.

We claim:

1. An apparatus for transporting a container, comprising:
   a rigid frame having a pair of forked frame members defining a gap between them, and a levered handle extension angled with respect to the forked frame members;
   the levered handle extension has at least one pin;
   a first connection part and a second connection part; the first and the second connection parts sandwich the levered handle extension to the frame; and a third connection part removably secures the first and the second connection parts;
   the first and the second connection parts form a pin channel for receiving the at least one pin on the levered handle extension;
   the third connection part has at least one boss;
   the third connection part rotates from a first locked position to a second unlocked position;
   whereby in the first locked position, the at least one boss on the third connection part blocks the at least one pin on the levered handle extension from moving from the pin channel;
   whereby in the second unlocked position, the at least one boss on the third connection part no longer blocks the at least one pin on the levered handle extension from moving from the pin channel; a pair of wheels attached so they each respectively support one of said forked frame members;
   a pair of mounting supports located respectively on each of said forked frame members, said mounting supports protruding upwards from said forked frame members; each of said mounting supports having a slot;
   a container holder pivotally attached to the slots of the mounting supports, said container holder adapted to securely support substantially around a container; and
   wherein the container holder is adapted to pivot with the weight of the container as the levered handle extension is raised or lowered so that the container remains in an upright position regardless of the position of the levered handle extension.

2. The apparatus of claim 1, wherein the apparatus has a first resting position and a second active position;
   in the first resting position, the levered handle extension is at a first elevation;
   in the second active position, the levered handle extension is a second elevation; and
   the second elevation is higher than the first elevation.

3. The apparatus of claim 1, wherein the levered handle extension has a locking mechanism to engage the container holder.

4. The apparatus of claim 1, wherein the container holder comprises a rigid circular band with two posts on its outer periphery on opposing sides, each of said posts positioned in the slots of said mounting supports.

5. The apparatus of claim 1, wherein said levered handle extension terminates in a handle member and said levered handle extension is detachable from the portion of the rigid frame connected to the forked frame members.

6. The apparatus of claim 1, wherein said levered handle extension is substantially S-shaped, having a first portion substantially parallel with the forked frame members, a second portion substantially perpendicular to said forked frame members, and a third portion terminating in a handle substantially parallel with the forked frame members.

7. The apparatus of claim 1, wherein the container holder is a detachable tray, and said tray has at least two tray connection points for engaging the slots on the mounting supports.

8. An apparatus for transporting an object comprising:
   a frame, which has a first frame end and a second frame end and a center;
   a handle body, which has a first handle body end and a second handle body end;
   the first handle body end is a handle;
   the second handle body end is removably connected to the frame;
   the second handle body end has at least one pin;
   a first handle body connection part and a second handle body connection part; the first and the second handle body connection parts sandwich the second handle body end and a portion of the frame;
   a rotatable collar removably secures the first handle body connection part and the second handle body connection part around the second handle body end and the portion of the frame;
   the first and the second handle body connection parts form a pin channel for receiving the at least one pin on the second handle body end;
   the rotatable collar has at least one boss;
   the rotatable collar rotates from a first locked position to a second unlocked position;
   whereby in the first locked position, the at least one boss on the rotatable collar blocks the at least one pin on the second handle body end from moving from the pin channel;
   whereby in the second unlocked position, the at least one boss on the rotatable collar no longer blocks the at least one pin on the second handle body end from moving from the pin channel;
   the first and the second frame ends are each connected to a vertical support;
   each said vertical support has a first vertical support end and a second vertical support end;
   the first vertical support end has a slot;
   the second vertical support end comprises:
      a first hole of the second vertical support end; a second hole of the second vertical support end; the first and the second holes of the second vertical support end are oriented perpendicularly with respect to one another;
      the first and the second frame ends are connected to the vertical support through the second hole of the second vertical support end;
   an axle engages the first hole of the second end of said each vertical support;
   a wheel is connected to said each axle; and
      the slot of the first vertical support end engages a pivoting container holder;

whereby the pivoting container holder supports substantially around said object.

9. The apparatus of claim 8, wherein the container holder further comprises a rotatable clip.

10. The apparatus of claim 8 the container holder is a tray; said container holder having at least two connection points for engaging the slots on the vertical supports.

11. An apparatus for transporting an object comprising:
a frame, which has a first frame end and a second frame end and a center;
a handle body, which has a first handle body end and a second handle body end;
the first handle body end is a handle;
the second handle body end is removably connected to the frame;
the second handle body end has at least one pin;
a first handle body connection part and a second handle body connection part; the first and the second handle body connection parts sandwich the second end of the handle body and a portion of the frame;
the first and the second handle body connection parts form a pin channel for receiving the at least one pin on the second handle body end;
a rotatable third connection part removably secures the first handle body connection part and the second handle body connection part around the second handle body end and the portion of the frame;
the third connection part has at least one boss;
the rotatable third connection part rotates from a first locked position to a second unlocked position;
whereby in the first locked position, the at least one boss on the third connection part blocks the at least one pin on the second handle body end from moving from the pin channel;
whereby in the second unlocked position, the at least one boss on the third connection part no longer blocks the at least one pin on the second handle body end from moving from the pin channel;
the first frame end and the second frame end are each connected to a vertical support;
each said vertical support has a first vertical support end and a second vertical support end;
each said first vertical support end has a slotted receptor;
each said second vertical support end is connected to an axle and a wheel;
the first and the second frame ends are connected to the vertical support; and
the slotted receptor of the first vertical support end engages a pivoting container holder;
whereby the pivoting container holder supports substantially around said object.

12. The apparatus of claim 11 the pivoting container holder is a tray; said pivoting container holder having at least two connection points for engaging the slots on the vertical supports.

13. The apparatus of claim 11 wherein said second vertical support end has a flange; the first and the second frame ends are connected to the vertical support through said flange.

14. The apparatus of claim 11, wherein the handle body has a securing device, which is located at the first end of the handle body, for connecting to a vehicle.

* * * * *